(12) United States Patent
Park et al.

(10) Patent No.: US 8,913,211 B2
(45) Date of Patent: Dec. 16, 2014

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Jung Hoon Park, Andong-si (KR); Je Hwan Sin, Gumi-si (KR); Sang Hun Baek, Gyeongsan-si (KR)

(73) Assignee: LG Display Co., Ltd. (KR)

( * ) Notice: Subject to any disclaimer, the term of this patent is extended or adjusted under 35 U.S.C. 154(b) by 172 days.

(21) Appl. No.: 13/728,845

(22) Filed: Dec. 27, 2012

(65) Prior Publication Data
US 2013/0308074 A1 Nov. 21, 2013

(30) Foreign Application Priority Data
May 17, 2012 (KR) .................. 10-2012-0052564

(51) Int. Cl.
*G02F 1/1333* (2006.01)
*G02F 1/1335* (2006.01)
*F21V 7/04* (2006.01)
*F21V 8/00* (2006.01)

(52) U.S. Cl.
CPC ........ *G02B 6/0088* (2013.01); *G02F 1/133615* (2013.01); *G02B 6/0085* (2013.01); *G02F 1/133308* (2013.01)
USPC .................. 349/58; 349/64; 349/65; 362/634

(58) Field of Classification Search
CPC .................. G02F 1/133308; G02F 1/133608; G02F 1/13452; G02F 1/133615; G02F 1/133603; G02F 1/133604; G02B 6/0068; G02B 6/0038; G02B 6/0031
USPC ................................. 349/58, 61, 65; 362/634
See application file for complete search history.

(56) References Cited

U.S. PATENT DOCUMENTS 6,386,722 B2 * 5/2002 Okumura ...................... 362/633
7,826,002 B2 * 11/2010 Lee et al. ......................... 349/58

FOREIGN PATENT DOCUMENTS

KR 10-2012-0026675 A 3/2012

* cited by examiner

*Primary Examiner* — Mike Qi
(74) *Attorney, Agent, or Firm* — Birch, Stewart, Kolasch & Birch, LLP

(57) ABSTRACT

Discussed are a backlight unit and an LCD device including the same, which prevent the thermal deformation and movement of a light guide plate and realize uniform luminance. The backlight unit includes a supporting case supporting a supporting side wall having a receiving space, a light guide plate placed in the receiving space of the supporting case, a light source member irradiating light on a light incident surface prepared in a side surface of the light guide plate, an optical sheet member disposed on the light guide plate, and a plurality of holder members disposed at certain intervals between the supporting side wall and some side surfaces of the light guide plate except the light incident surface. The holder members are deformed in shape by thermal deformation of the light guide plate.

20 Claims, 15 Drawing Sheets

BACKLIGHT UNIT AND LIQUID CRYSTAL DISPLAY DEVICE INCLUDING THE SAME

CROSS-REFERENCE TO RELATED APPLICATIONS

This application claims the benefit of the Korean Patent Application No. 10-2012-0052564 filed on May 17, 2012, which is hereby incorporated by reference as if fully set forth herein.

BACKGROUND

1. Field of the Invention

The present invention relates to a backlight unit and a liquid crystal display (LCD) device including the same.

2. Discussion of the Related Art

Recently, flat panel display devices that can decrease a weight and a volume corresponding to the limitations of Cathode Ray Tubes (CRTs) are being developed. Liquid Crystal Display (LCD) devices, Plasma Display Panels (PDPs), Field Emission Display (FED) devices, and light emitting display devices are actively being researched as flat type display devices. However, among such flat panel display devices, LCD devices are easily manufactured, have good drivability of drivers, realize a high-quality image, and thus are attracting much attention.

LCD devices display a moving image by using thin film transistors (TFTs) as switching elements. LCD devices are used as display devices for notebook computers, tablet computers, navigations, or various portable information devices, in addition to televisions or monitors.

Since LCD devices are not self-emitting devices, a backlight unit is prepared under a liquid crystal display panel, and the LCD devices display an image by using light emitted from the backlight unit.

A light emitting diode (LED) is attracting much attention as a light source of the backlight unit. The LED is eco-friendly because having a good energy-saving effect and has a high response time, and thus are attracting much attention as a next-generation light source.

General backlight units are categorized into edge-type backlight units, in which one or more light sources are disposed to face at least one side surface of a light guide plate, and direct-type backlight units in which a plurality of light sources are disposed under a diffusive plate. Recently, the edge-type backlight units are mainly used with the sliming trend of LCD devices.

The edge-type backlight units use a light guide plate for traveling light, emitted from a light source, to a liquid crystal display panel, but a defect is caused by the thermal deformation and movement of the light guide plate. In an LCD device disclosed in Korean Patent Publication No. 10-2012-0026675 (hereinafter referred to as a reference document), a plurality of guide grooves are formed in an edge of a light guide plate, and a boss is formed in a cover bottom corresponding to the guide grooves, thereby preventing the thermal deformation and movement of the light guide plate by using the boss and the guide grooves.

However, the LCD device disclosed in the reference document has the following limitations.

First, non-uniform luminance occurs due to the light reflection of the guide grooves formed in the light guide plate.

Second, the boss is broken by the thermal deformation of the light guide plate.

Third, the size of the light guide plate is enlarged by the guide grooves of the light guide plate, causing the increase in the Bezel width of the LCD device.

SUMMARY

Accordingly, the present invention is directed to a backlight unit and an LCD device including the same that substantially obviate one or more problems due to limitations and disadvantages of the related art.

An aspect of the present invention is directed to a backlight unit and an LCD device including the same, which prevent the thermal deformation and movement of a light guide plate and realize uniform luminance.

Another aspect of the present invention is directed to an LCD device for decreasing the Bezel width.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a backlight unit including: a supporting case supporting a supporting side wall having a receiving space; a light guide plate placed in the receiving space of the supporting case; a light source member irradiating light on a light incident surface prepared in a side surface of the light guide plate; an optical sheet member disposed on the light guide plate; and a plurality of holder members disposed at certain intervals between the supporting side wall and some side surfaces of the light guide plate except the light incident surface, the holder members being deformed in shape by thermal deformation of the light guide plate.

In another aspect of the present invention, there is provided an LCD device including: the backlight unit; a liquid crystal display panel disposed on the backlight unit; a guide frame disposed in the supporting case of the backlight unit, and supporting a rear edge portion of the liquid crystal display panel; a rear cover receiving the supporting case, and surrounding a side surface of the guide frame; and a front cover coupled to the rear cover to surround a front edge portion and side surface of the liquid crystal display panel.

In another aspect of the present invention, there is provided an LCD device including: the backlight unit; a liquid crystal display panel disposed on the backlight unit; a guide frame disposed in the supporting case of the backlight unit, and coupled to a rear edge portion of the liquid crystal display panel by a coupling member; a panel driver connected to one side of the liquid crystal display panel; a rear cover receiving the supporting case, and surrounding a side surface of the guide frame, a side surface of the panel driver, and a side surface of the liquid crystal display panel; and a deco cover coupled to the rear cover to cover one side of the liquid crystal display panel, and externally exposing an entire front surface except one side of the liquid crystal display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
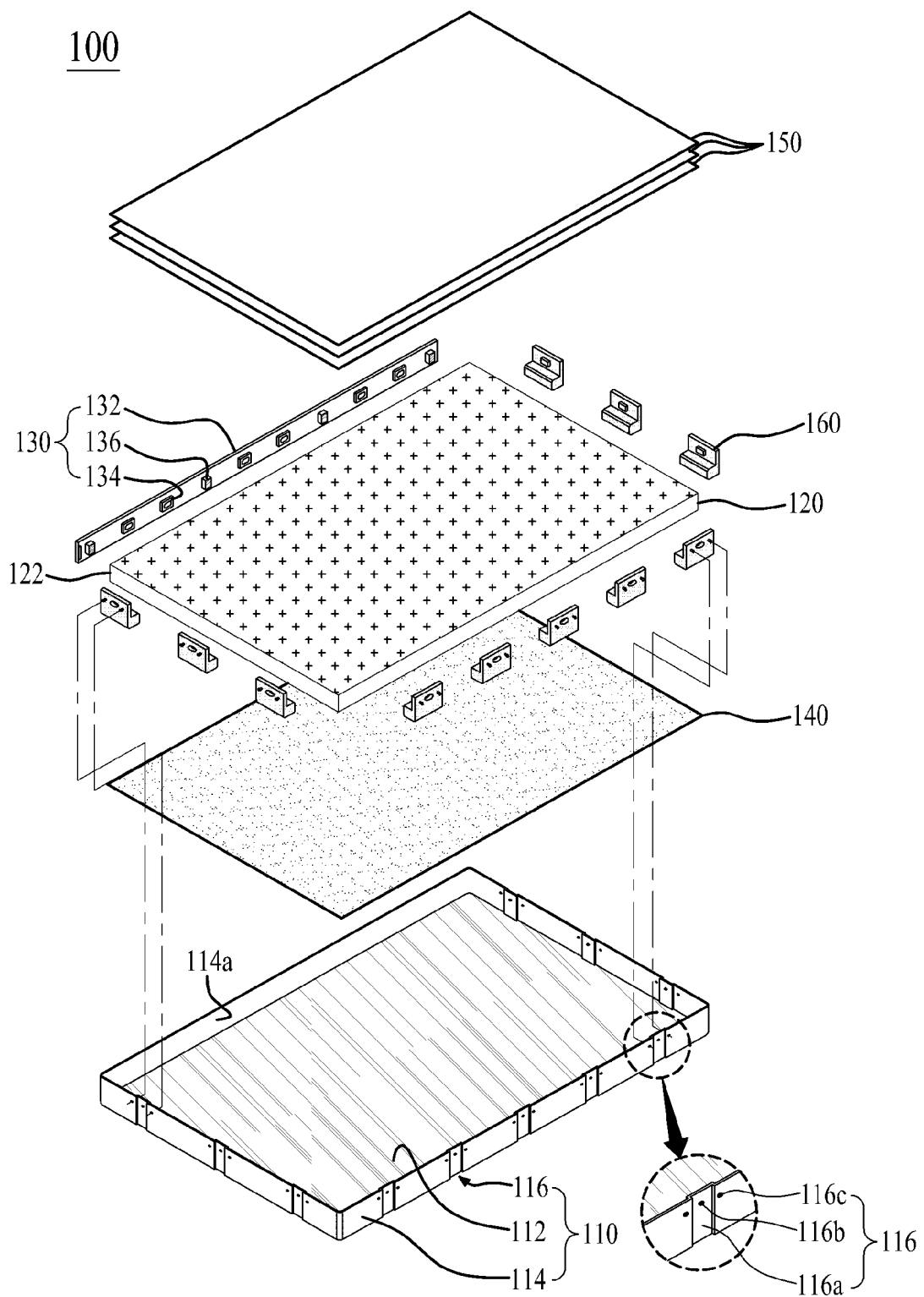
FIG. 1 is an exploded perspective view schematically illustrating a backlight unit according to a first embodiment of the present invention.
Figure 2:
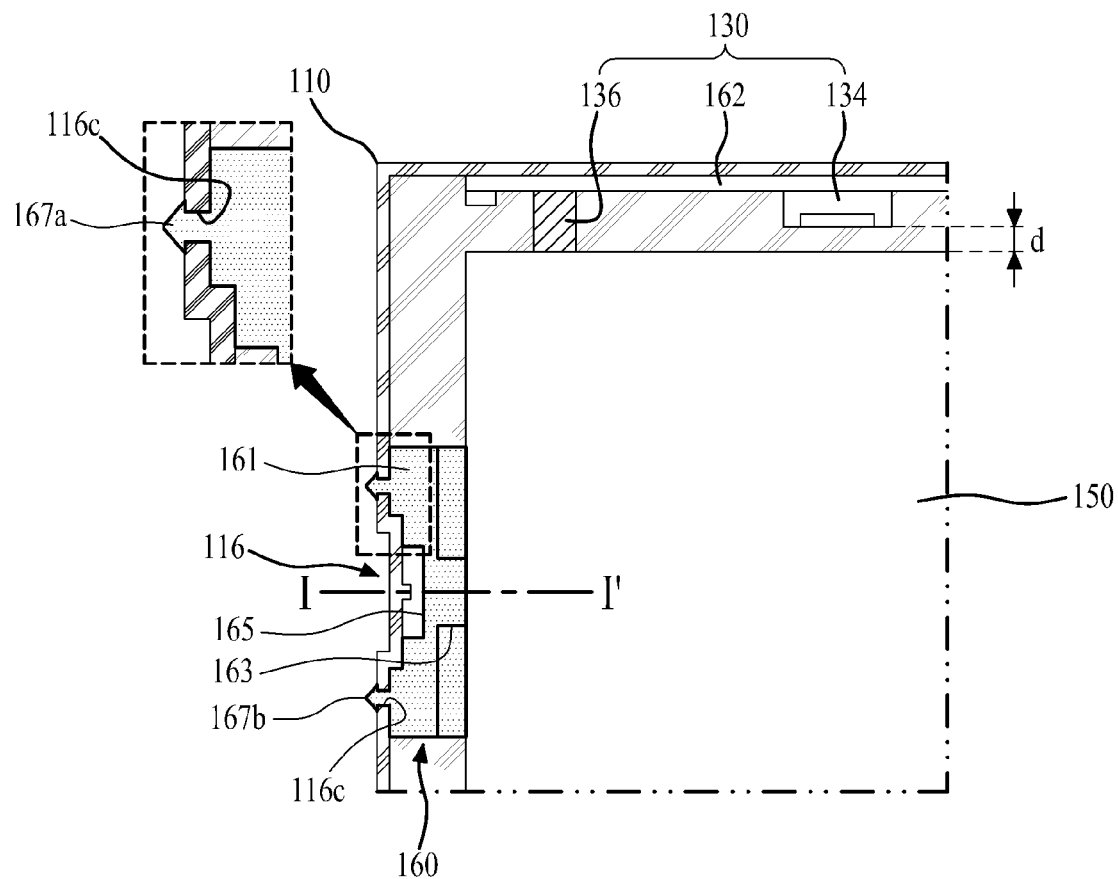
FIG. 2 is a plan view illustrating an enlarged one side corner portion of the backlight unit according to the first embodiment of the present invention.

FIG. 1 is an exploded perspective view schematically illustrating a backlight unit according to a first embodiment of the present invention. FIG. 2 is a plan view illustrating an enlarged one side corner portion of the backlight unit according to the first embodiment of the present invention.

Referring to FIGS. 1 and 2, a backlight unit 100 according to the first embodiment of the present invention includes a supporting case 110 having a receiving space, a light guide plate 120 placed in the supporting case 100, a light source member 130 irradiating light on an light incident surface of the light guide plate 120, a reflective sheet 140 disposed under the light guide plate 120, an optical sheet member 150 disposed on the light guide plate 120, and a plurality of holder members 160 that are disposed at certain intervals between the supporting case 110 and each of side surfaces except the light incident surface among the side surfaces of the light guide plate 120.

The supporting case 110 is formed in a box shape in which a top of the supporting case 110 is opened to have the receiving space for receiving the optical member 130, the reflective sheet 140, and the light guide plate 120. The supporting case 110 may be formed of a plastic material or a metal material, but may be formed of a metal material for dissipating the heat of the light guide plate 120 and the heat of the light source member 130. The supporting case 110 includes a supporting plate 112, a supporting side wall 114, and a plurality of holder coupling parts 116.

The supporting plate 112 supports the light source member 130 and the reflective sheet 140. The supporting side wall 114 is bent vertically from an edge end of the supporting plate 112 to prepare a receiving space in the supporting plate 112.

The holder coupling parts 116 are formed at certain intervals in each of a plurality supporting side walls except one long side of the supporting side wall 114. The holder members 160 are attachably/detachably coupled to the holder coupling members 116, respectively. Each of the holder coupling parts 116 includes a holder contact portion 116a that protrudes from an inner side surface of the supporting side wall 114 to the receiving space, an insertion projection 116b that protrudes from an inner side surface of the holder contact portion 116a to the receiving space, and a pair of coupling holes 116c that are formed to pass through the supporting side wall 114 adjacent to both sides of the holder contact portion 116a.

The light guide plate 120 is placed in the supporting case 110, and travels light, emitting from the light source member 130, to a front surface of the light guide plate 120. To this end, the light guide plate 120 may be formed in a plate shape and may include an light incident surface 122 prepared in one side surface of the light guide plate 120. Alternatively, the light guide plate 120 may be formed in a plate shape, and a bottom of the light guide plate 120 may be inclined such that a height decreases progressively closer from one side surface to the other side surface. The light guide plate 120 internally reflects and refracts light which is incident from the light source member 130 to the light incident surface 122, and travels the refracted light to the front surface of the light guide plate 120.

The light source member 130 is placed in one side of the supporting case 110, and irradiates light on the light incident surface 122 of the light guide plate 120. To this end, the light source member 130 includes an LED array board 132, a plurality of LED packages 134, and a plurality of gap maintaining member 136.

The LED array board 132 is vertically formed in parallel to an inner surface of a one side supporting side wall 114a among the supporting side walls 114 of the supporting case 110, and faces the light incident surface 122 of the light guide plate 120. The LED array board 132 is a metal printed circuit board (MPCB), and may be attached to an inner surface of the one side supporting side wall 114a by a double-sided tape (not shown). The LED array board 132 includes an LED driving connector receiving an LED driving signal from the outside, and a plurality of signal lines that are connected to the LED driving connector and respectively supply the LED driving signal to the LED packages 134.

A coating member (not shown) of a reflective material may be further formed at an inner surface of the LED array board 132. The coating member reflects light, which is emitted from the LED packages and is reflected without being incident on the light incident surface 122 of the light guide plate 120, to the light incident surface 122 of the light guide plate 120.

The LED packages 134 are disposed at certain intervals in the LED array board 132 to be electrically connected to the respective signal lines formed in the LED array board 132. In this case, each of the LED packages 134 is separated by a certain distance from the light incident surface 122 of the light guide plate 120. The LED packages emits light according to the LED driving signal supplied from the respective signal lines of the LED array board 132, and irradiates the emitted light on the light incident surface 122 of the light guide plate 120.

The gap maintaining members 136 are disposed at certain intervals in an inner surface of the LED array board 132 to face the light incident surface 122 of the light guide plate 120. Each of the gap maintaining members 136 surface-contacts the light incident surface 122 of the light guide plate 120 and maintains a constant gap (distance) "d" between the light incident surface of the light guide plate 120 and the LED package 134, and thus minimizes a light spot area due to the overlap of light irradiated from the LED packages 134 onto the light guide plate 120, thus preventing the LED packages 134 from being damaged due to the movement of the light guide plate 120. Each of the gap maintaining members 136 is formed of an elastic material, for example, a silicon material, and thus, when the light guide plate 120 is thermally expanded at a high temperature, each of the gap maintaining members 136 may be contracted (or compressed), or when the light guide plate 120 is contracted from a high-temperature state to a normal-temperature state, each of the gap maintaining members 136 may be restored to the original shape.

The light source member 130, as illustrated in FIG. 1, has been described above as being disposed at the one side of the light guide plate 120, but is not limited thereto. As another example, the light source member 130 may be disposed at both sides of the light guide plate 120.

The reflective sheet 140 is placed in an lower portion of the light guide plate 120, namely, the supporting plate 112 of the supporting case 110. The reflective sheet 140 reflects light, which travels to the bottom of the light guide plate 120, to the front surface of the light guide plate 120, thus decreasing the loss of light.

The optical sheet member 150 is disposed on the light guide plate 120 and enhances the luminance characteristic of light emitted from a front direction of the light guide plate 120. To this end, the optical sheet member 150 may include at least one diffusive sheet and prism sheet of a lower diffusive sheet, a lower prism sheet, an upper prism sheet, and an upper diffusive sheet.

The holder members 160 are disposed at certain intervals between are disposed at certain intervals between the supporting case 110 and each of the other side surfaces except the light incident surface 122 among the side surfaces of the light guide plate 120. Each of the holder members 160 supports a bottom edge portion of the light guide plate 120 to thereby prevent the sag of the light guide plate 120, and, after assembly, the deviation of the holder members 160 is prevented by the bottom edge portion of the light guide plate 120.

Moreover, each of the holder members 160 is deformed in shape due to the thermal deformation of the light guide plate 120, thereby preventing the movement and thermal deformation of the light guide plate 120. That is, each of the holder members 160 provides a thermal expansion space for accommodating the thermal expansion of the light guide plate 120 when the light guide plate 120 is thermally expanded at a high temperature, thereby preventing the deformation of the light guide plate 120 when the light guide plate 120 is thermally expanded at a high temperature. Furthermore, each of the holder members 160 maintains a shape thereof at a normal temperature, thereby preventing the movement of the light guide plate 120.

Each of the holder members 160 may be formed of an elastic material, and particularly an elastic material (for example, a silicon material) having a hardness of 50 degrees to 75 degrees such that each holder member 160 is expanded when the light guide plate 120 is contracted or contracted when the light guide plate 120 is expanded. In this case, when each holder member 160 has a hardness less than a hardness of 50 degrees, it is unable to obtain a desired effect for preventing the movement of the light guide plate 120, or when each holder member 160 has a hardness of 75 degrees or more, it is unable to obtain a desired effect for preventing the thermal expansion of the light guide plate 120. That is, the light guide plate 120 is expanded in hardness or is expanded and then contracted to be restored to the original shape, according to heat inputted from the light source member 130 or an ambient temperature. When the holder member 160 is formed of a material other than an elastic material, a center portion of the light guide plate 120 is concavely or convexly bent when the light guide plate 120 is thermally expanded at a high temperature. Also, in a case where a gap space is prepared near the light guide plate 120 for preventing the deformation of the light guide plate 120 when the light guide plate 120 is thermally expanded at a high temperature, the movement of the light guide plate 120 that is restored to the original shape at the normal temperature occurs. Accordingly, the holder member 160 of the present invention maintains a shape at the normal temperature to thereby prevent the movement of the light guide plate 120, and when the light guide plate 120 is thermally expanded at a high temperature, the holder member 160 is contracted (or compressed) to thereby prevent the deformation of the light guide plate 120 expanded by heat.

Each of the holder members 160 surface-contacts a light non-incident surface of the light guide plate 120, and thus may be formed to have a non-reflective color such as a dark color (for example, black or gray) that cannot reflect light passing through the light non-incident surface of the light guide plate 120.

Figure 3:
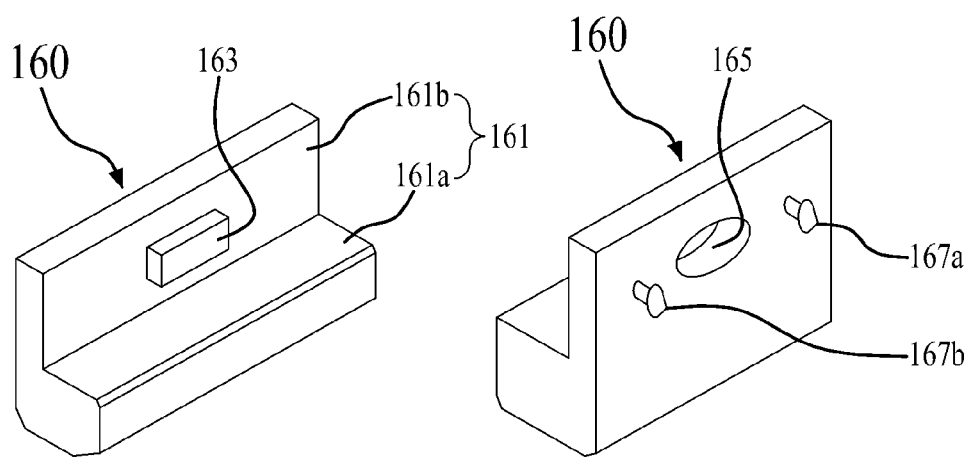
FIG. 3 is a perspective view illustrating a holder member of FIGS. 1 and 2.
Figure 4:
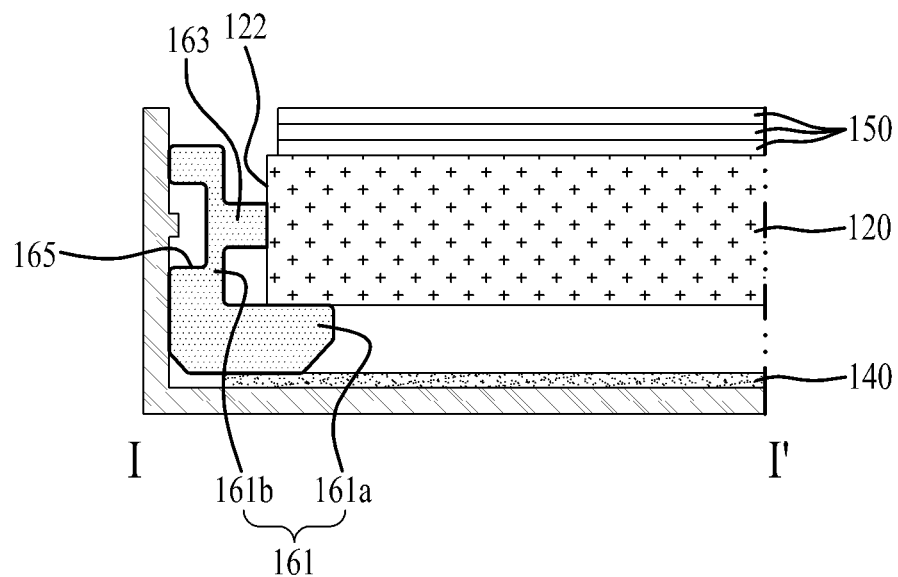
FIG. 4 is a sectional view schematically illustrating a sectional surface taken along line I-I of FIG. 2.

Each of the holder members 160, as illustrated in FIGS. 2 to 4, includes a body 161, a protrusion portion 163, a groove portion 165, and a pair of coupling projections 167a and 167b.

The body 161 is vertically disposed in parallel to an inner side surface of the supporting side wall 114, supports a bottom edge portion of the light guide plate 120, and faces a side surface of the light guide plate 120. The body 161 includes a light guide plate supporting part 161a that supports the bottom edge portion of the light guide plate 120, and a vertical part 161b that protrudes vertically from an outer end of the light guide plate supporting part 161a to face the side surface of the light guide plate 120.

Figure 5:
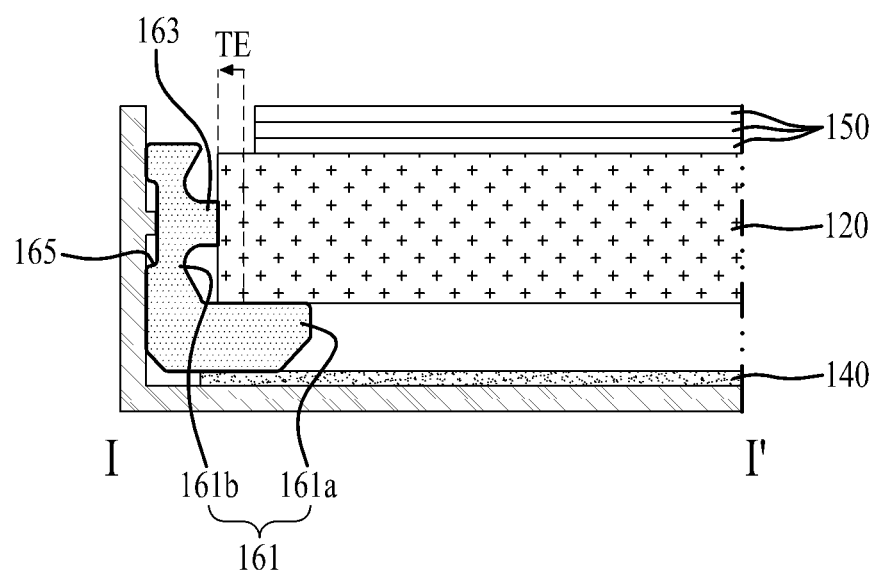
FIG. 5 is a sectional view for describing the prevention of the deformation of a light guide plate due to a holder member when the light guide plate is thermally expanded, in an embodiment of the present invention.

The protrusion portion 163 protrudes from an inner side surface of the body 161, namely, an inner side surface of the vertical part 161b to have a certain length, and surface-contacts the side surface of the light guide plate 120. In this case, the protrusion portion 163 may protrude to have a rectangular parallelepiped shape. The protrusion portion 163 is deformed in shape due to the thermal deformation of the light guide plate 120. That is, as illustrated in FIGS. 4 and 5, the protrusion portion 163 maintains the original shape at the normal temperature due to elastic characteristic thereof to thereby prevent the movement of the light guide plate 120, and when the light guide plate 120 is thermally expanded at a high temperature, the protrusion portion 163 is contracted (or compressed) to thereby prevent the deformation of the light guide plate 120 expanded by heat.

The groove portion 165 is formed concavely to have a certain depth from an outer side surface of the body 161 (i.e., an outer side surface of the vertical part 161b) in correspondence with the insertion projection 116b formed in the supporting case 110. The groove portion 165 provides a compressive space that enables the deformation of the protrusion portion 163 due to the thermal expansion of the light guide plate 120. That is, as illustrated in FIG. 5, when the light guide plate 120 is thermally expanded "TE", the protrusion portion 163 surface-contacting the side surface of the light guide plate 120 and the vertical part 161b near the protrusion portion 163 are compressed from the compressive space provided by the groove portion 165, thereby preventing the deformation of the light guide plate 120 expanded by heat.

The pair of coupling projections 167a and 167b protrude parallelly toward the supporting side wall 114 to have a certain length from the outer side surface of the body 161, namely, the outer side surface of the vertical part 161b. The pair of coupling projections 167a and 167b, as illustrated in FIG. 2, are respectively inserted into and coupled to a pair of coupling holes 116c formed in the supporting side wall 114, and couples or fixes the body 161 to the inner side surface of the supporting side wall 114. To this end, each of the pair of coupling projections 167a and 167b includes an insertion portion inserted into each of the pair of coupling holes 116c, and a coupling head that is integrated with a distal end of the insertion portion to have a diameter greater than that of the insertion portion. A stepped portion between the insertion portion and the coupling head is caught to the outer side surface of the supporting side wall 114, thereby enabling the body 161 to be coupled to the inner side surface of the supporting side wall 114.

The following description will be made on a method of assembling the backlight unit 100 according to the first embodiment of the present invention.

First, the reflective sheet is placed in the receiving space of the supporting case 110.

Subsequently, the holder members 160 are respectively coupled to the holder coupling parts 116 prepared in the supporting side wall 114 of the supporting case 110. That is, the coupling projections 167a and 167b of each of the holder members 160 are respectively inserted into the coupling holes 116c of the holder coupling part 116, and thus, each of the holder members 160 is installed at the supporting side wall 114. Here, a bottom of each of the holder members 160 may be disposed at a top edge portion of the reflective sheet 140, or disposed at the supporting plate 112 of the supporting case 110.

Subsequently, the light source member 130 is installed at the inner side surface of the one side supporting side wall 114a of the supporting case 110.

Subsequently, the light guide plate 120 is disposed on the body 161 of each holder member 160. In this case, the protrusion portion 163 of each holder member 160 surface-contacts the other side surfaces except the light incident surface 122 of the light guide plate 120, thereby preventing the movement of the light guide plate 120.

Subsequently, the optical sheet member 150 is disposed on the light guide plate 120.

In the backlight unit 100 according to the first embodiment of the present invention, each of the holder members 160 installed between the supporting side wall 114 of the supporting case 110 and the light guide plate 120 is deformed in shape due to the thermal deformation of the light guide plate 120, and maintains a shape thereof at the normal temperature, thus preventing the deformation of the light guide plate 120 expanded by heat and preventing the movement of the light guide plate 120 at the normal temperature.

FIGS. 6 to 9 are views for describing various modification embodiments of each of the holder members in the backlight unit according to the first embodiment of the present invention.

Figure 6:
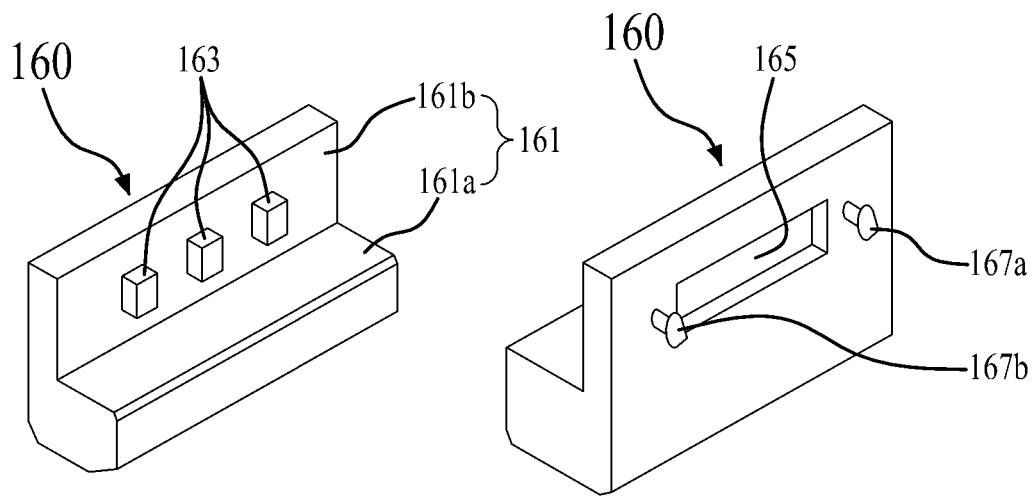
FIG. 6 is a view for describing a first modification embodiment of the holder member of FIGS. 1 and 2.

Each of a plurality of holder members 160 according to a first modification embodiment, as illustrated in FIG. 6, includes a body 161, a plurality of protrusion portions 163, a groove portion 165, and a pair of coupling projections 167a and 167b. Except for the protrusion portions 163, the other elements are the same as the holder member of FIG. 3, and thus, repetitive descriptions on the same elements are not provided.

Each of the protrusion portions 163 protrudes from an inner side surface of the body 161 (i.e., the inner side of the vertical part 161b) to have a certain length, and the protrusion portions 163 are disposed at certain intervals. Therefore, a compressive space in which a corresponding protrusion portion 163 is compressed is prepared between adjacent protrusion portions 163.

In each of the holder members 160 according to the first modification embodiment, each of the protrusion portions 163 is compressed into the compressive space prepared in the groove part 165 when the light guide plate 120 is thermally expanded at a high temperature, and moreover is compressed into the compressive space between adjacent protrusion portions 163, thereby better preventing the deformation of the light guide plate 120.

Figure 7:
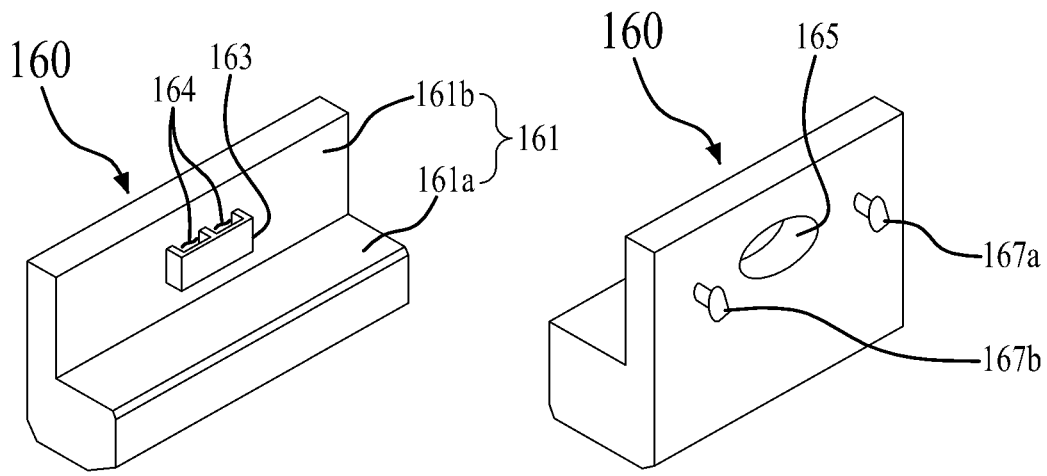
FIG. 7 is a view for describing a second modification embodiment of the holder member of FIGS. 1 and 2.

Each of a plurality of holder members 160 according to a second modification embodiment, as illustrated in FIG. 7, includes a body 161, a protrusion portion 163, a plurality of hollow portions 164, a groove portion 165, and a pair of coupling projections 167a and 167b. Except that each of the holder members 160 further includes the hollow portions 164, the other elements are the same as the holder member of FIG. 3, and thus, repetitive descriptions on the same elements are not provided.

Each of the hollow portions 164 is formed to vertically pass through the protrusion portion 163. Therefore, a plurality of compressive spaces in which the protrusion portion 163 is compressed by each of the hollow portions 164 are prepared inside the protrusion portion 163.

In each of the holder members 160 according to the second modification embodiment, the protrusion portion 163 is compressed into the compressive space prepared in the groove part 165 when the light guide plate 120 is thermally expanded at a high temperature, and moreover is compressed into the compressive space prepared by each of the hollow portions 164, thereby better preventing the deformation of the light guide plate 120 expanded by heat.

Figure 8:
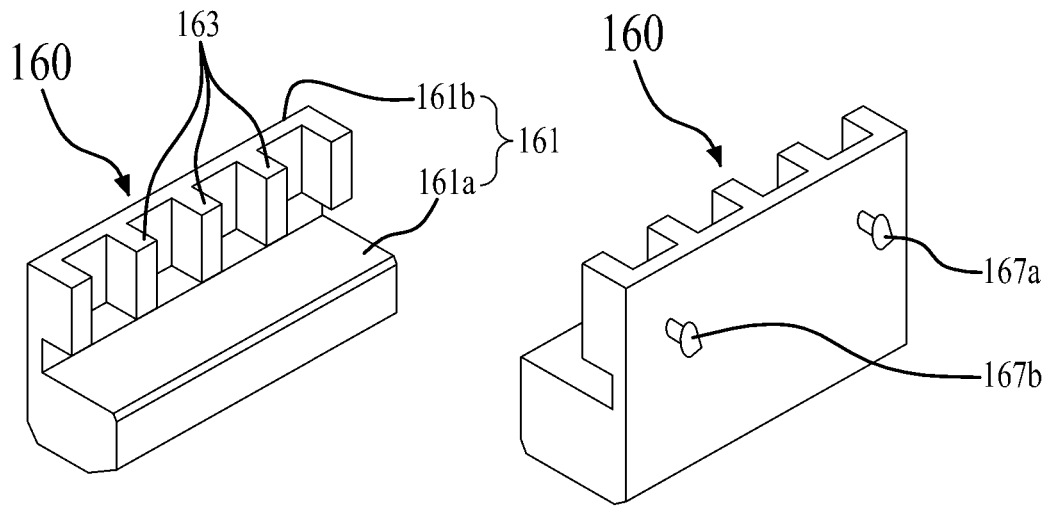
FIG. 8 is a view for describing a third modification embodiment of the holder member of FIGS. 1 and 2.

Each of a plurality of holder members 160 according to a third modification embodiment, as illustrated in FIG. 8, includes a body 161, a plurality of protrusion portions 163, and a pair of coupling projections 167a and 167b. Except that the protrusion portions 163 protrude lengthily and a groove portion is not provided, the other elements are the same as the holder member of FIG. 3, and thus, repetitive descriptions on the same elements are not provided.

The protrusion portions 163 are disposed at certain intervals, and each of the protrusion portions 163 protrudes from an inner side surface of the body 161 (i.e., the inner side of the vertical part 161b) to have a certain length and surface-contacts the side surface of the light guide plate 120. Therefore, a compressive space in which a corresponding protrusion portion 163 is compressed is prepared between adjacent protrusion portions 163. When the light guide plate 120 is thermally expanded at a high temperature, each of the protrusion portions 163 is compressed and simultaneously inclined to one side or the other side, thereby preventing the deformation of the light guide plate 120 expanded by heat. Each of the protrusion portions 163 is restored to the original shape at the normal temperature, thereby preventing the movement of the light guide plate 120.

In each of the holder members 160 according to the third modification embodiment, when the light guide plate 120 is thermally expanded at a high temperature, each of the protrusion portions 163 is compressed and simultaneously inclined to one side or the other side, thereby better preventing the deformation of the light guide plate 120 expanded by heat.

Figure 9:
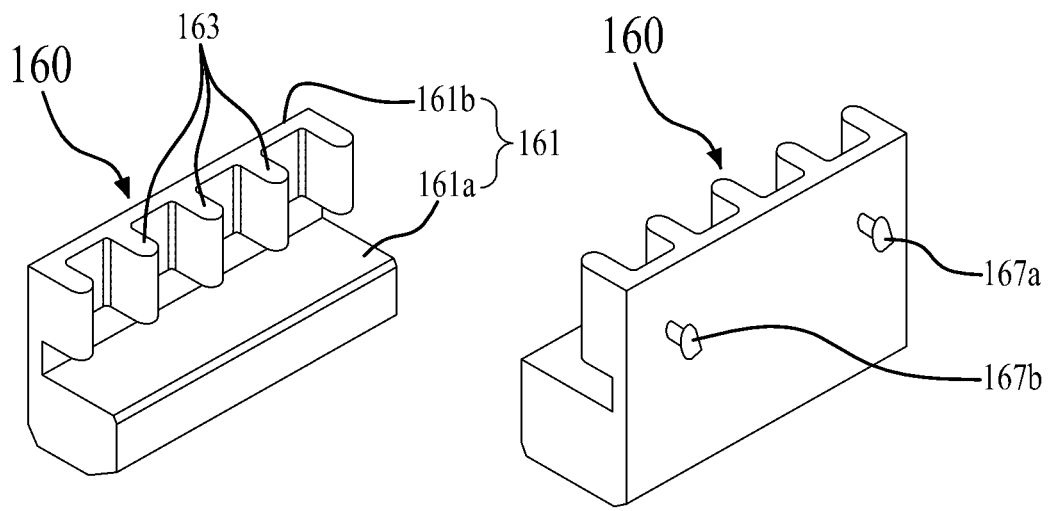
FIG. 9 is a view for describing a fourth modification embodiment of the holder member of FIGS. 1 and 2.

Each of a plurality of holder members 160 according to a fourth modification embodiment, as illustrated in FIG. 9, includes a body 161, a plurality of protrusion portions 163, and a pair of coupling projections 167a and 167b. Except for the shape of each of the protrusion portions 163, the holder members 160 according to the fourth modification embodiment are the same as the holder member of FIG. 8 according to the third modification embodiment.

The protrusion portions 163 are disposed at certain intervals, and each of the protrusion portions 163 protrudes from an inner side surface of the body 161 (i.e., the inner side of the vertical part 161b) to have a certain length and surface-contacts the side surface of the light guide plate 120. In this case, a distal end of each protrusion portion 163 is formed to have a curved surface (for example, a semicircular shape or an oval shape). When the light guide plate 120 is thermally expanded at a high temperature, each of the protrusion portions 163 is compressed and simultaneously inclined to one side or the other side, thereby preventing the deformation of the light guide plate 120 expanded by heat. Each of the protrusion portions 163 is restored to the original shape at the normal temperature, thereby preventing the movement of the light guide plate 120.

In each of the holder members 160 according to the fourth modification embodiment, when the light guide plate 120 is thermally expanded at a high temperature, each of the protrusion portions 163 is compressed and simultaneously inclined to one side or the other side, thereby better preventing the deformation of the light guide plate 120 expanded by heat.

Figure 10:
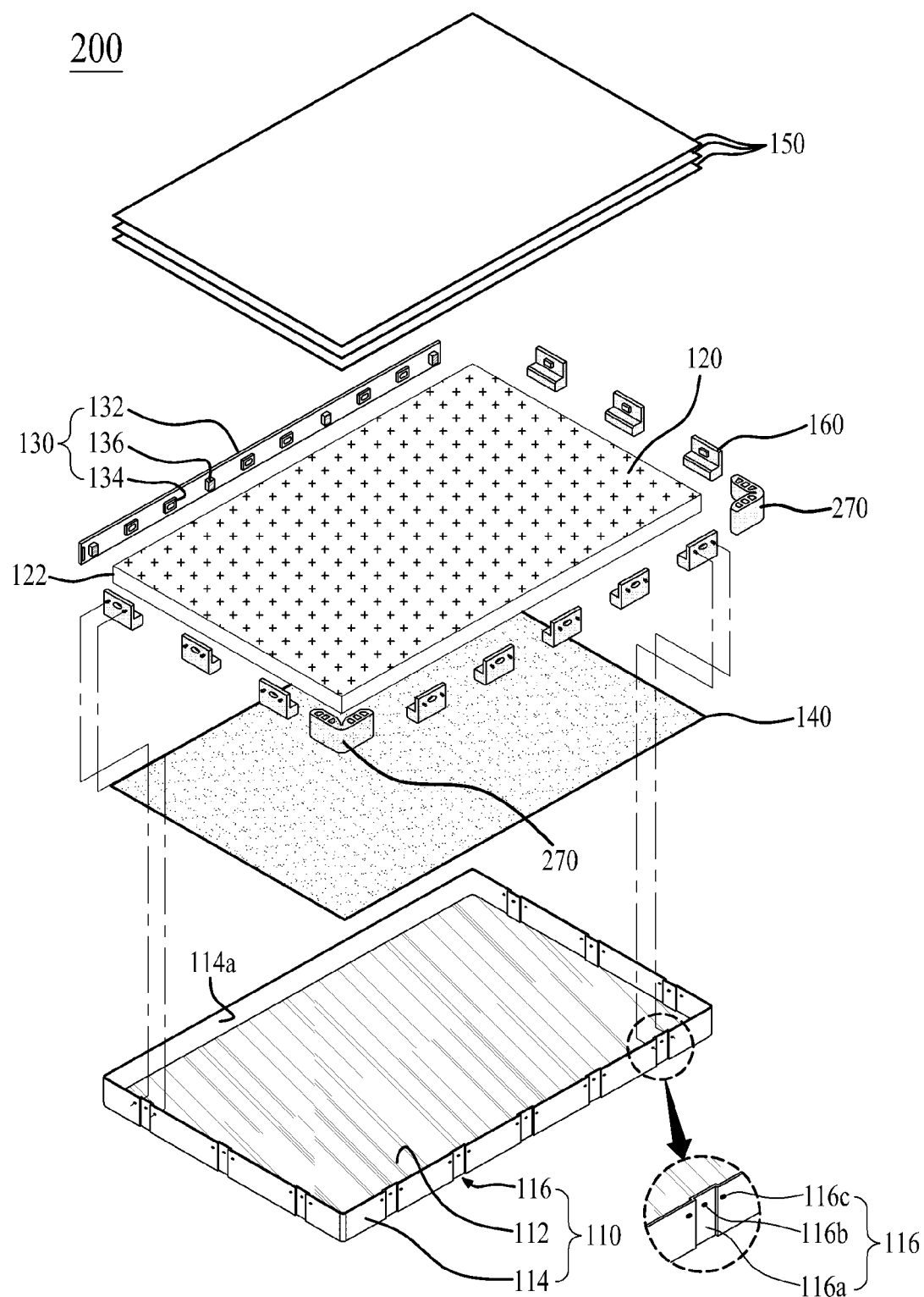
FIG. 10 is an exploded perspective view schematically illustrating a backlight unit according to a second embodiment of the present invention.
Figure 11:
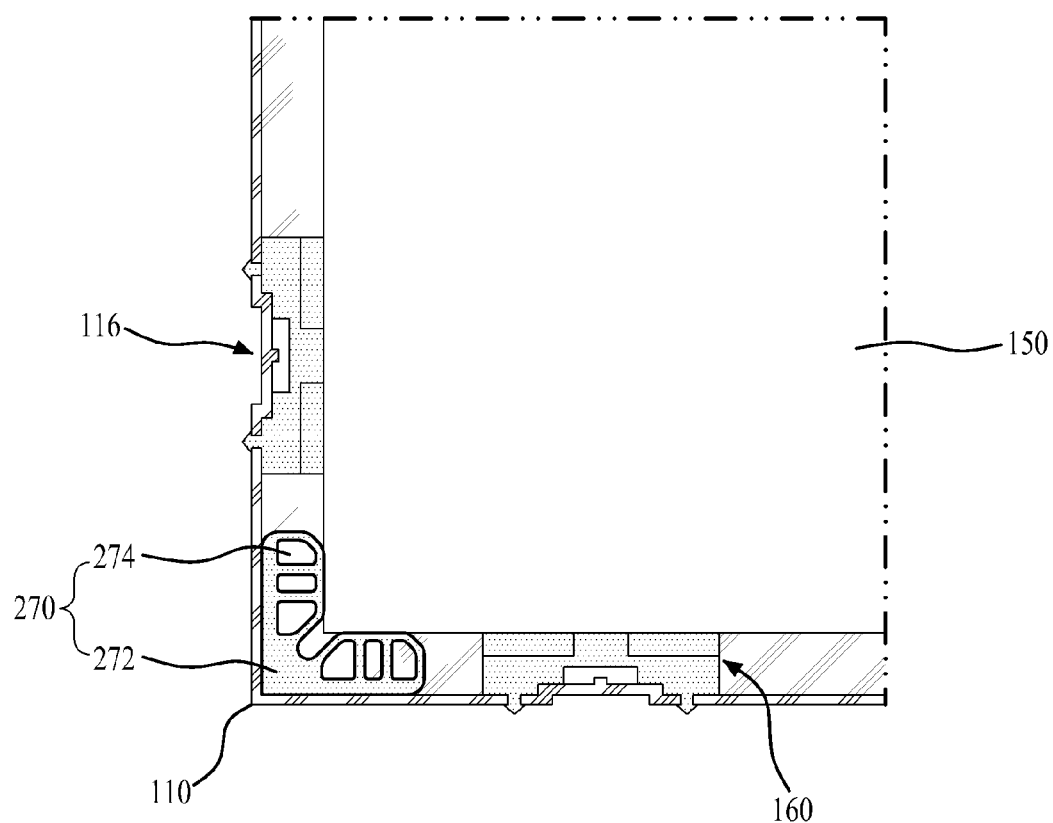
FIG. 11 is a plan view illustrating an enlarged one side corner portion of the backlight unit according to a second embodiment of the present invention.

FIG. 10 is an exploded perspective view schematically illustrating a backlight unit according to a second embodiment of the present invention. FIG. 11 is a plan view illustrating an enlarged one side corner portion of the backlight unit according to a second embodiment of the present invention.

Referring to FIGS. 10 and 11, a backlight unit 200 according to the second embodiment of the present invention includes the supporting case 110, the light guide plate 120, the light source member 130, the reflective sheet 140, the optical sheet member 150, the plurality of holder members 160, and a corner holder member 270. Except that the backlight unit 200 further includes the corner holder member 270, the backlight unit 200 according to the second embodiment of the present invention having the above-described configuration is the same as the backlight unit 100 according to the first embodiment of the present invention. Thus, like reference numerals refer to like elements throughout, and the above descriptions are respectively applied to the same elements.

The corner holder member 270 is installed between the other side corner portion of the light guide plate 120 except one side corner portion contacting the light incident surface 122 of the light guide plate 120 and a corner portion of the supporting case 110 surrounding the other corner portion. The corner holder member 270 may be formed of the same material as that of the holder member 160. Therefore, the corner holder member 270 maintains the original shape at the normal temperature, and, when the light guide plate 120 is thermally deformed (i.e., when the light guide plate 120 is thermally expanded), the corner holder member 270 is compressed, thereby preventing the deformation of the other side corner portion of the light guide plate 120 expanded by heat. Also, the corner holder member 270 maintains the original shape at the normal temperature, thereby preventing the movement of the other side corner portion of the light guide plate 120.

Figure 12:
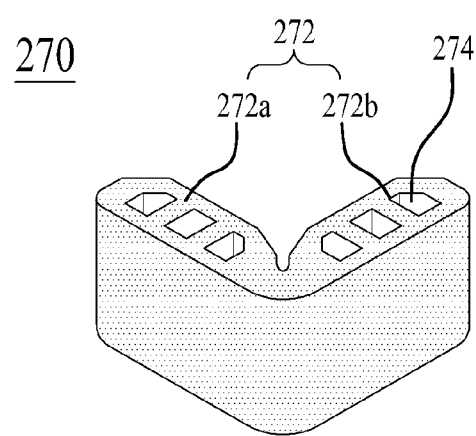
FIG. 12 is a perspective view illustrating a holder member of FIGS. 10 and 11.

The corner holder member 270, as illustrated in FIG. 12, includes a body 272 and a plurality of hollow portions 274.

The body 272 is disposed at an inner surface of the other side corner portion of the supporting case 110 prepared by the supporting side wall 114 of the supporting case 110, and surface-contacts each side surface of the other side corner portion of the light guide plate 120. To this end, the body 272 is formed in a "⌐"-shape so as to include first and second wing portions 272a and 272b. The first wing portion 272a surface-contacts one side surface contacting the other side corner portion of the light guide plate 120, and the second wing portion 272b surface-contacts the other side surface contacting the other side corner portion of the light guide plate 120. The body 272 is formed of an elastic material so as to maintain the original shape at the normal temperature, thus preventing the deformation of the light guide plate 120 expanded by heat and preventing the movement of the other side corner portion of the light guide plate 120 at the normal temperature.

The hollow portions 274 are formed at certain intervals in each of the first and second wings 272a and 272b to vertically pass through the body 272, namely, each of the first and second wings 272a and 272b. Therefore, each of the first and second wings 272a and 272b has a plurality of compressive spaces due to the hollow portions 274. Each of the hollow portions 274 provides the plurality of compressive spaces in which the body 272 is compressed when the light guide plate 120 is thermally expanded at a high temperature.

Similarly to the above-described backlight unit 100 according to the first embodiment, in the backlight unit 200 according to the second embodiment of the present invention, the plurality of holder members 160 can prevent the deformation and movement of the light guide plate 120, and moreover, the corner holder member 270 can better prevent the deformation and movement of the corner portion of the light guide 120.

Figure 13:
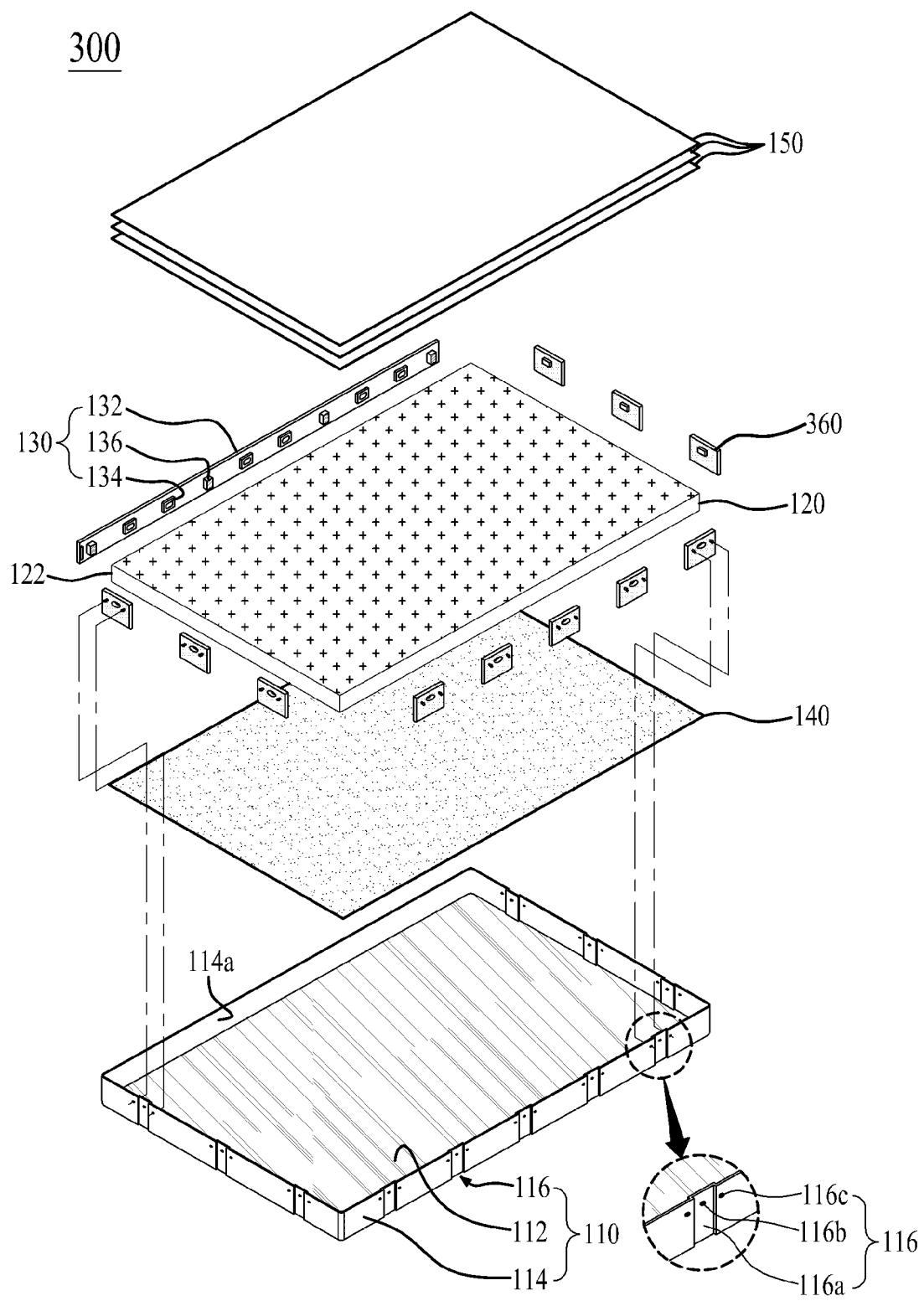
FIG. 13 is an exploded perspective view schematically illustrating a backlight unit according to a third embodiment of the present invention.
Figure 14:
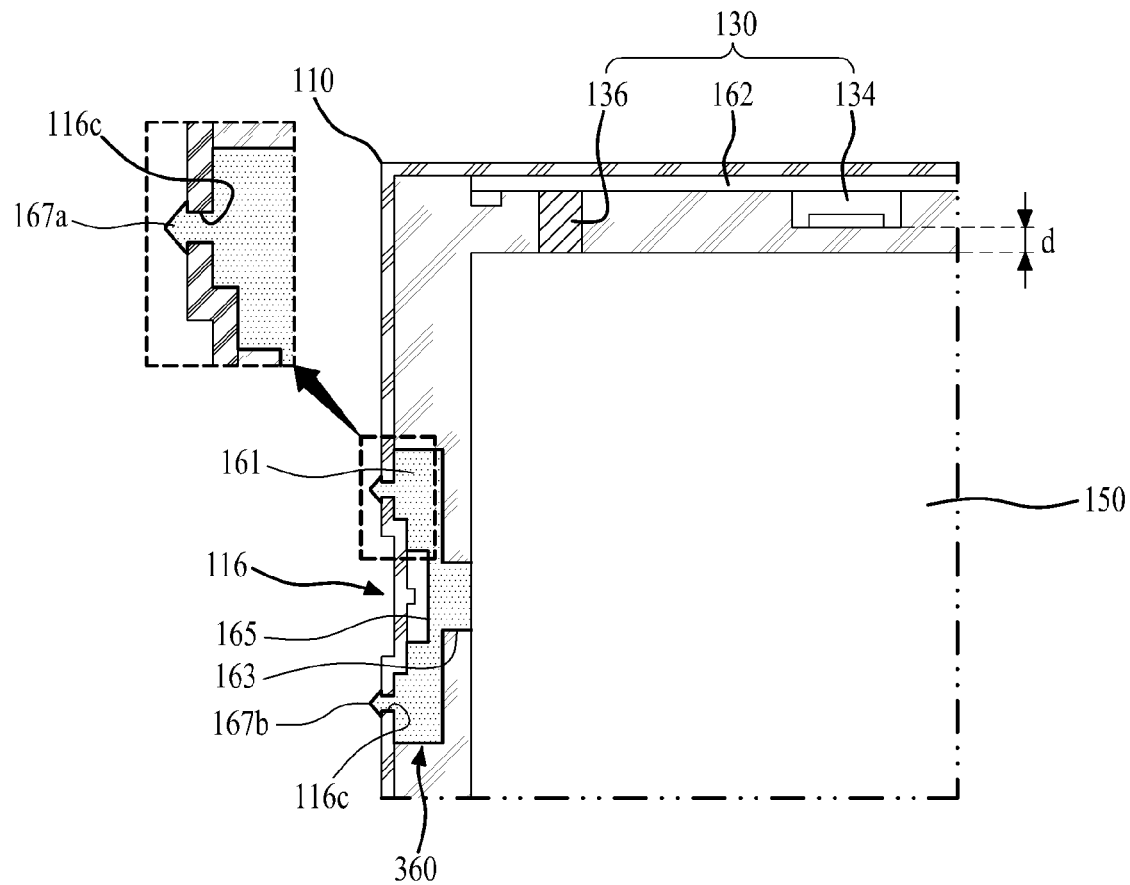
FIG. 14 is a plan view illustrating an enlarged one side corner portion of the backlight unit according to a third embodiment of the present invention.

FIG. 13 is an exploded perspective view schematically illustrating a backlight unit according to a third embodiment of the present invention. FIG. 14 is a plan view illustrating an enlarged one side corner portion of the backlight unit according to a third embodiment of the present invention.

Referring to FIGS. 13 and 14, a backlight unit 300 according to the third embodiment of the present invention includes the supporting case 110, the light guide plate 120, the light source member 130, the reflective sheet 140, the optical sheet member 150, and a plurality of holder members 360. Except that the holder members 360 are changed in structure, the backlight unit 300 according to the third embodiment having the above-described configuration is the same as the backlight unit 100 according to the first embodiment. Thus, like reference numerals refer to like elements throughout, and the above descriptions are respectively applied to the same elements.

Each of the holder members 360 is formed of the same material as that of the above-described holder member 160 of FIG. 3. Therefore, each of the holder members 360 maintains the original shape at the normal temperature, and, when the light guide plate 120 is thermally deformed (i.e., when the light guide plate 120 is thermally expanded), each of the holder members 360 is compressed, thereby preventing the deformation of the light guide plate 120 expanded by heat and preventing the movement of the light guide plate 120 at the normal temperature.

Figure 15:
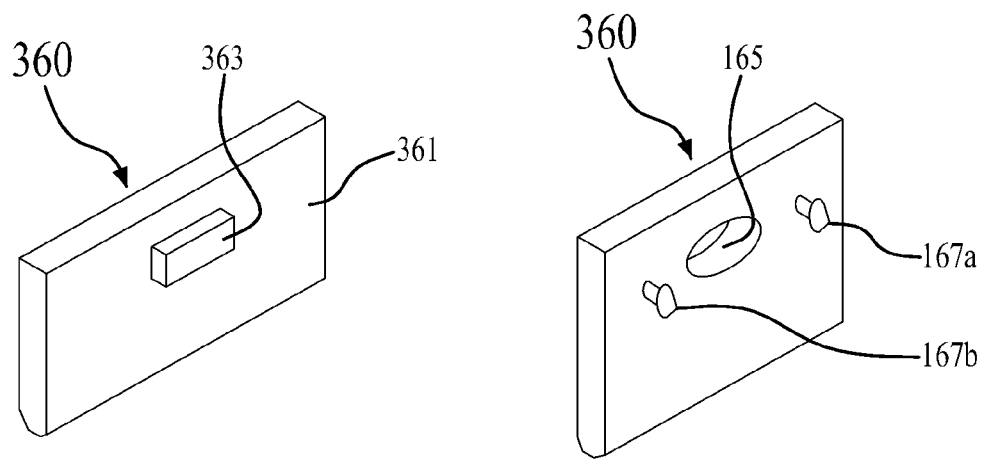
FIG. 15 is a perspective view illustrating a holder member of FIGS. 13 and 14.

Each of the holder members 360, as illustrated in FIG. 15, includes a body 361, a protrusion portion 363, the groove portion 165, and the pair of coupling projections 167a and 167b.

The body 361 is vertically disposed in parallel to the inner side surface of the supporting side wall 114 of the supporting case 110, and faces the side surface of the light guide plate 120. That is, the body 361 is formed in a "|"-shape, is vertically disposed to face the side surface of the light guide plate 120, and does not support the bottom edge portion of the light guide plate 120.

The protrusion portion 363 protrudes from an inner side surface of the body 361 to have a certain length, and surface-contacts the side surface of the light guide plate 120. In this case, the protrusion portion 363 may protrude to have a rectangular parallelepiped shape. The protrusion portion 363 is deformed in shape due to the thermal deformation of the light guide plate 120. That is, the protrusion portion 363 maintains the original shape at the normal temperature due to elastic characteristic thereof, and, when the light guide plate 120 is thermally expanded at a high temperature, the protrusion portion 363 is contracted (or compressed), thereby preventing the deformation of the light guide plate 120 expanded by heat and preventing the movement of the light guide plate 120.

Except that the groove portion 165 is concavely formed to have a certain depth from the outer side surface of the body 361 in correspondence with the insertion projection 116b formed in the supporting case 110, the groove portion 165 is the same that of FIG. 3, and thus, a repetitive description on the groove portion 165 is not provided.

Except that each of the pair of coupling projections 167a and 167b protrude parallelly toward the supporting side wall 114 to have a certain length from an outer side surface of the body 361, each of the pair of coupling projections 167a and 167b is the same that of FIG. 3, and thus, a repetitive description on the each of the pair of coupling projections 167a and 167b is not provided.

In the above description, each of the holder members 360 has been described as including one protrusion portion 363 that protrudes in a rectangular parallelepiped shape, but is not limited thereto. For example, as illustrated in FIG. 6, 8, or 9, each of the holder members 360 includes the plurality of protrusion portions, or, as illustrated in FIG. 7, each of the holder members 360 may include the plurality of hollow portions 164 that are formed to pass through the respective protrusion portions.

The backlight unit 300 according to the third embodiment of the present invention can provide the same effects as those of the backlight unit 100 according to the first embodiment of the present invention.

The backlight unit 300 according to the third embodiment of the present invention may further include the corner holder member 270 of FIGS. 10 to 12. In this case, the backlight unit 300 according to the third embodiment of the present invention can provide the same effects as those of the backlight unit 200 according to the second embodiment of the present invention.

Figure 16:
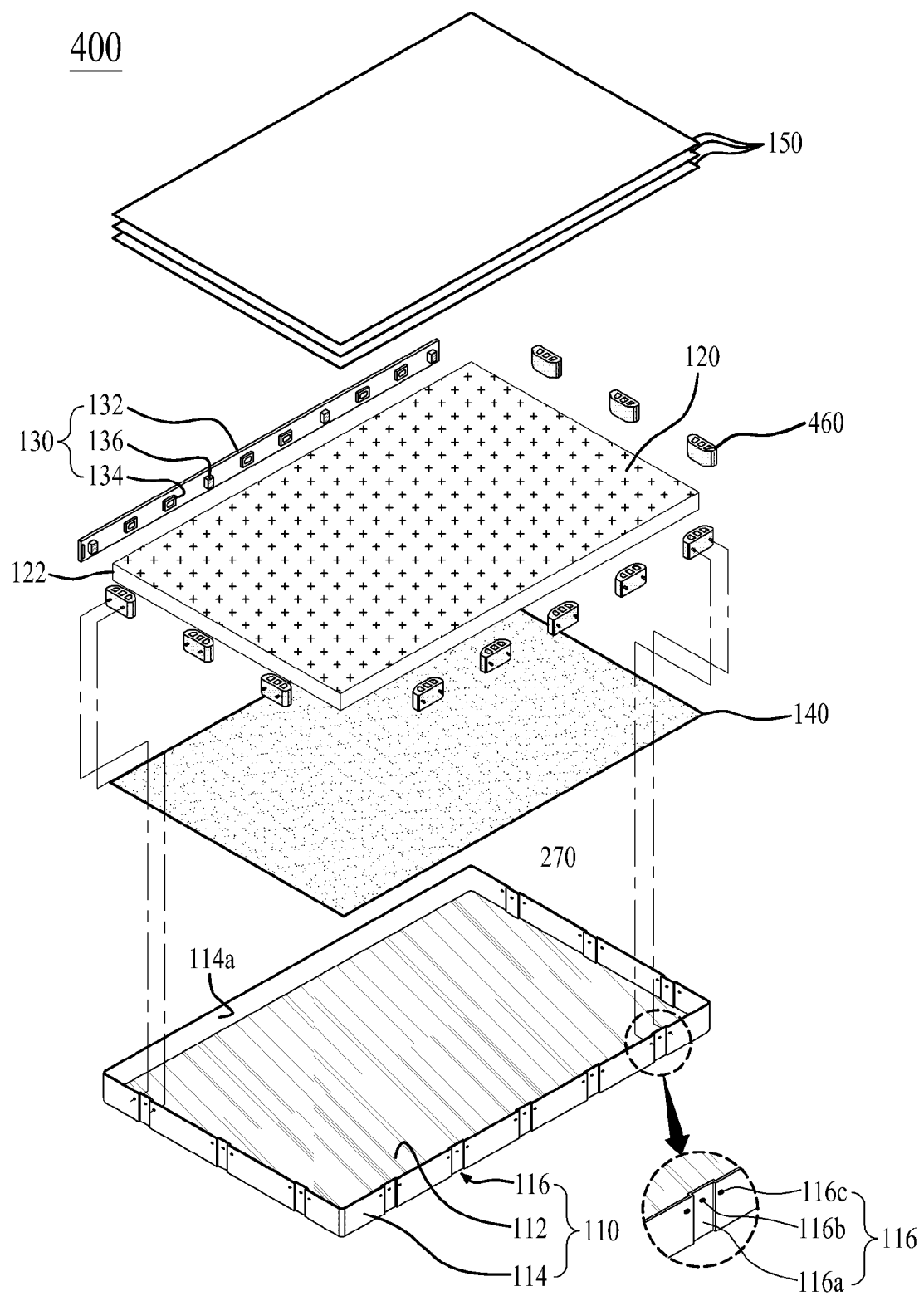
FIG. 16 is an exploded perspective view schematically illustrating a backlight unit according to a fourth embodiment of the present invention.
Figure 17:
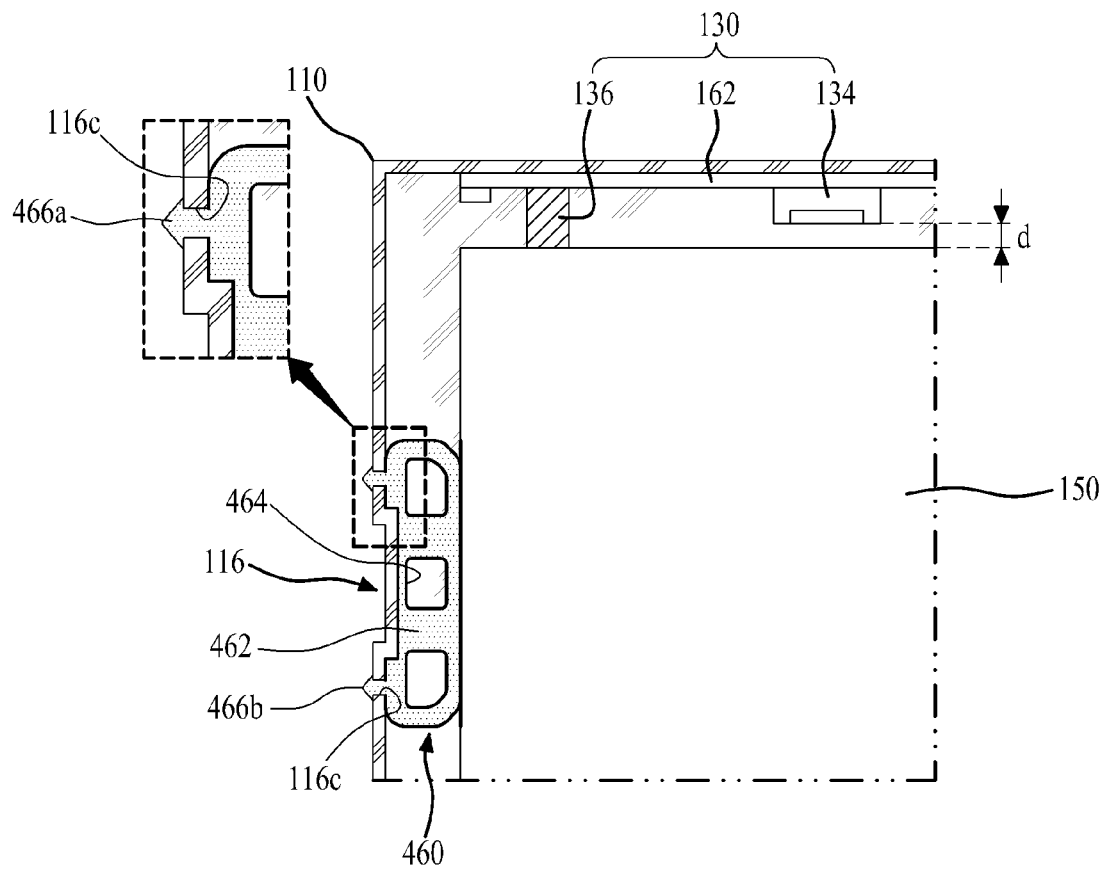
FIG. 17 is a plan view illustrating an enlarged one side corner portion of the backlight unit according to a fourth embodiment of the present invention.

FIG. 16 is an exploded perspective view schematically illustrating a backlight unit according to a fourth embodiment of the present invention. FIG. 17 is a plan view illustrating an enlarged one side corner portion of the backlight unit according to a fourth embodiment of the present invention.

Referring to FIGS. 16 and 17, a backlight unit 400 according to the fourth embodiment of the present invention includes the supporting case 110, the light guide plate 120, the light source member 130, the reflective sheet 140, the optical sheet member 150, and a plurality of holder members 460. Except that the holder members 460 are changed in structure, the backlight unit 400 according to the third embodiment having the above-described configuration is the same as the backlight unit 100 according to the first embodiment. Thus, like reference numerals refer to like elements throughout, and the above descriptions are respectively applied to the same elements.

The holder members 460 are disposed at certain intervals between are disposed at certain intervals between the supporting case 110 and each of the other side surfaces except the light incident surface 122 among the side surfaces of the light guide plate 120. Each of the holder members 460 is formed of the same material as that of the above-described holder member 160 of FIG. 3. Therefore, each of the holder members 360 maintains the original shape at the normal temperature, and, when the light guide plate 120 is thermally deformed (i.e., when the light guide plate 120 is thermally expanded), each of the holder members 360 is compressed, thereby preventing the deformation of the light guide plate 120 expanded by heat and preventing the movement of the light guide plate 120 at the normal temperature.

Figure 18:
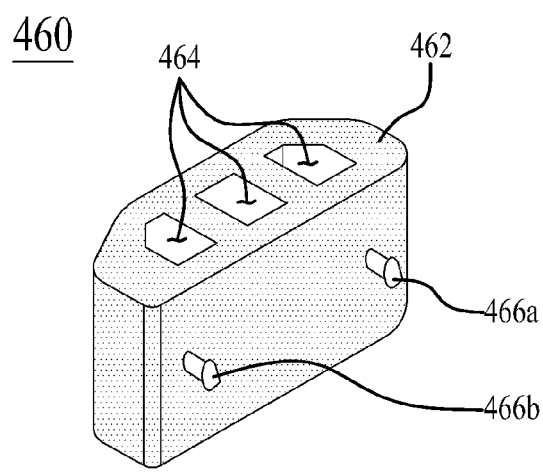
FIG. 18 is a perspective view illustrating a holder member of FIGS. 16 and 17.

Each of the holder members 460, as illustrated in FIG. 18, includes a body 462, a plurality of hollow portions 464, and a pair of coupling projections 466a and 466b.

The body 462 is formed in a rectangular parallelepiped shape in which corner portions of the body 462 are rounded, and disposed between the supporting side wall 114 of the supporting case 110 and the side surface of the light guide plate 120. The body 462 is formed of an elastic material to maintain the original shape at the normal temperature, and surface-contacts the side surface of the light guide plate 120, thereby preventing the deformation of the light guide plate 120 expanded by heat and preventing the movement of the light guide plate 120 at the normal temperature.

The hollow portions 464 are formed at certain intervals in each of the body 462 to vertically pass through the body 462. Therefore, the body 462 has a plurality of compressive spaces due to the hollow portions 464. Each of the hollow portions 464 provides the plurality of compressive spaces in which the body 462 is compressed when the light guide plate 120 is thermally expanded at a high temperature.

The pair of coupling projections 466a and 466b protrude parallelly toward the supporting side wall 114 to have a certain length from the outer side surface of the body 462. The pair of coupling projections 466a and 466b, as illustrated in FIG. 17, are respectively inserted into and coupled to a pair of coupling holes 116c formed in the supporting side wall 114, and couples or fixes the body 161 to the inner side surface of the supporting side wall 114. To this end, each of the pair of coupling projections 466a and 466b includes an insertion portion inserted into each of the pair of coupling holes 116c, and a coupling head that is integrated with a distal end of the insertion portion to have a diameter greater than that of the insertion portion. A stepped portion between the insertion portion and the coupling head is caught to the outer side surface of the supporting side wall 114, thereby enabling the body 462 to be coupled to the inner side surface of the supporting side wall 114.

In each of the holder members 460, when the light guide plate 120 is thermally expanded at a high temperature, an inner side portion of the body 462 surface-contacting the side surface of the light guide plate 120 is compressed into the hollow portions 464 due to elastic characteristic, thereby preventing the deformation of the light guide plate 120 expanded by heat. Furthermore, each of the holder members 460 maintains the original shape at the normal temperature due to elastic characteristic, thereby preventing the movement of the light guide plate 120 at the normal temperature.

Similarly to the above-described backlight unit 100 according to the first embodiment, in the backlight unit 400 according to the fourth embodiment of the present invention, the plurality of holder members 160 can prevent the deformation and movement of the light guide plate 120.

The backlight unit 400 according to the fourth embodiment of the present invention may further include the corner holder member 270 of FIGS. 10 to 12. In this case, the backlight unit 400 according to the fourth embodiment of the present invention can further provide the same effects as those of the backlight unit 200 according to the second embodiment of the present invention.

Figure 19:
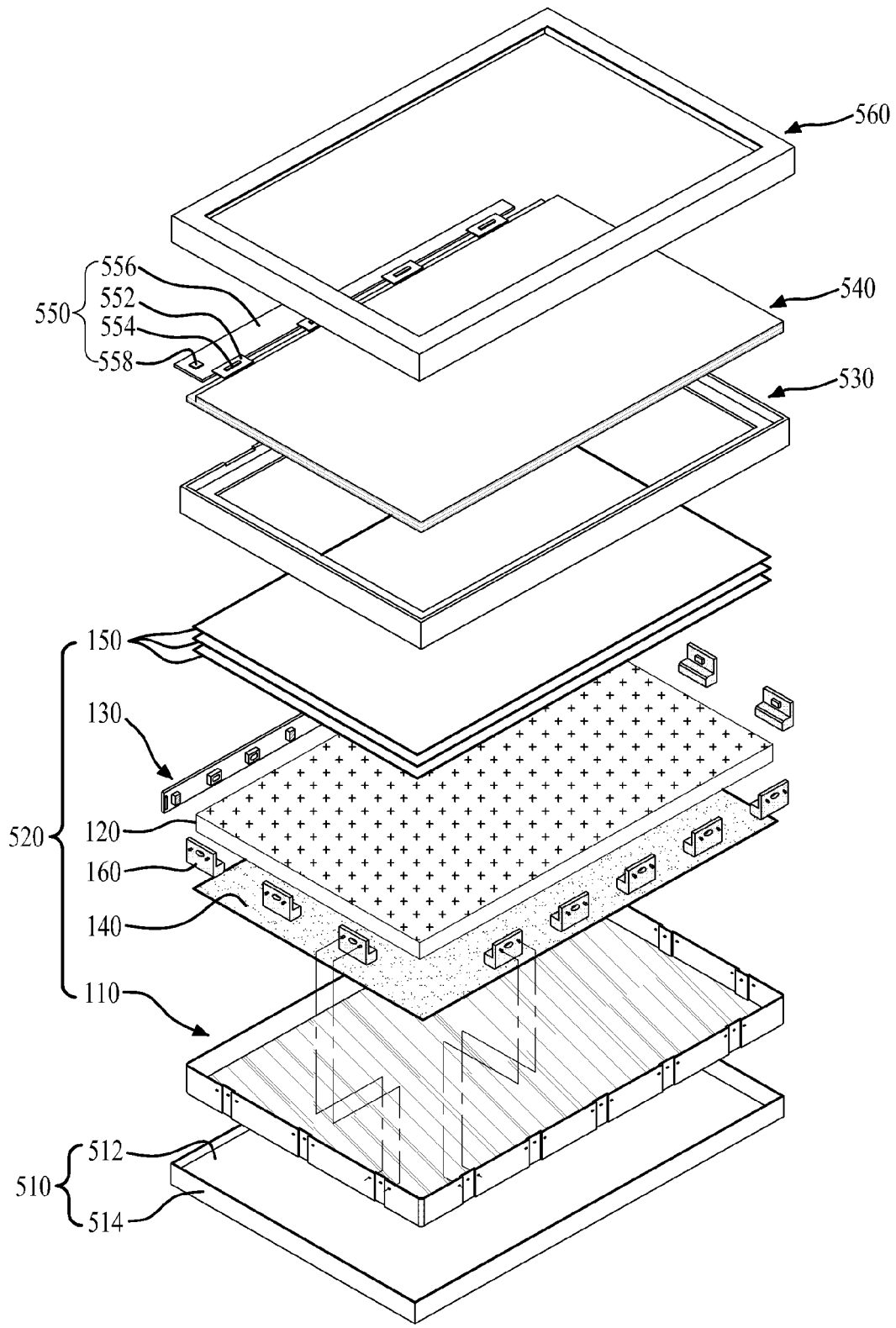
FIG. 19 is an exploded perspective view schematically illustrating an LCD device according to a first embodiment of the present invention.
Figure 20:
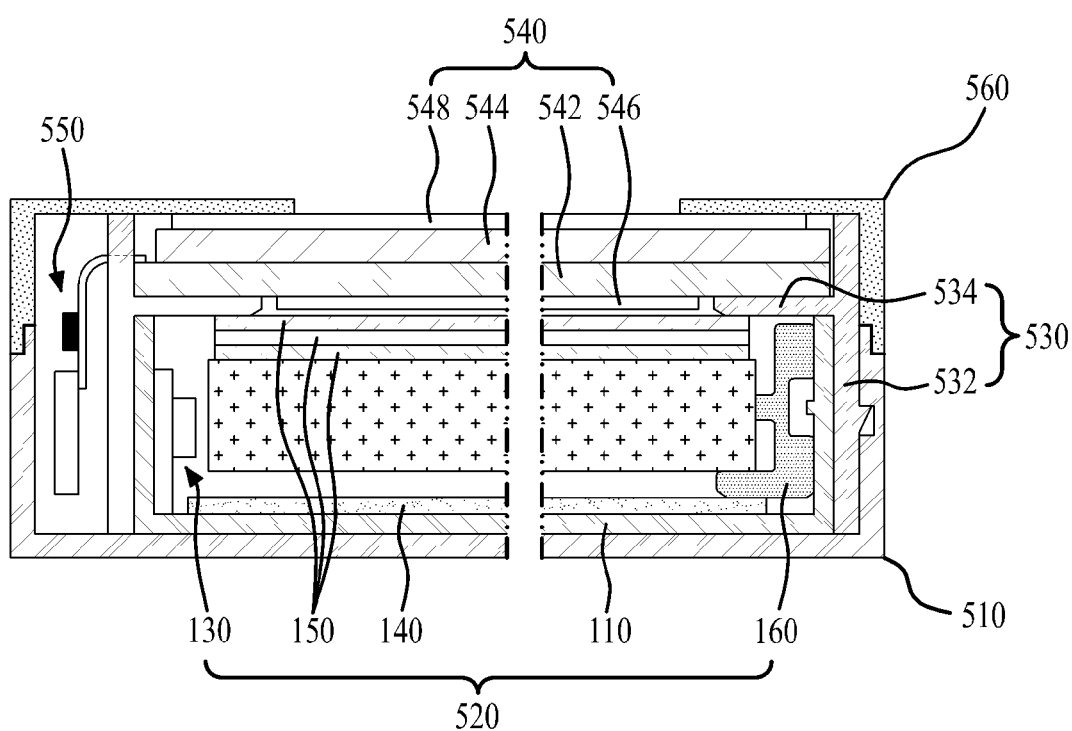
FIG. 20 is a sectional view schematically illustrating a partially sectional surface of the LCD device according to the first embodiment of the present invention.

FIG. 19 is an exploded perspective view schematically illustrating an LCD device according to a first embodiment of the present invention. FIG. 20 is a sectional view schematically illustrating a partially sectional surface of the LCD device according to the first embodiment of the present invention.

Referring to FIGS. 19 and 20, the LCD device according to the first embodiment of the present invention includes a rear cover 510, a backlight unit 520, a guide frame 530, a liquid crystal display panel 540, a panel driver 550, and a front cover 560.

The rear cover 510 receives the backlight unit 520, the guide frame 530, and the panel driver 550. A rear surface and side surface of the rear cover 510 are exposed to the outside of the LCD device, and acts as a cover surrounding a rear surface and side surface of a produced LCD device. Therefore, the rear cover 510 may be formed of a plastic material or a metal material, and for example, may be formed of a metal material for enhancing the aesthetic appearance of a produced LCD device.

The rear cover 510 includes a cover plate 512 and a cover side wall 514.

The cover plate 512 acts as a rear product cover of a produced LCD device. That is, the cover plate 512 may be a rear product cover of a display product such as a television, a notebook computer, or a tablet computer.

The cover side wall 514 is vertically bent from an edge portion of the cover plate 512 to prepare a receiving space in the cover plate 512, and surrounds the backlight unit 520, the guide frame 530, and the panel driver 550 that are placed in the receiving space. The cover side wall 514 acts as a side product cover of a produced LCD device, and may be a side product cover of a display product such as a television, a notebook computer, or a tablet computer.

The backlight unit 520 includes the supporting case 110, the light guide plate 120, the light source member 130, the optical sheet 140, the optical sheet member 150, and the plurality of holder members 160. The backlight unit 520 having the above-described configuration is the same as the backlight unit 100 according to the first embodiment of the present invention of FIGS. 1 to 9, and thus, the descriptions of FIGS. 1 to 9 are applied to the backlight unit 520.

The supporting case 110 of the backlight unit 520 is placed in the receiving space of the rear cover 510. In this case, the supporting case 110 and the rear cover 510 may be coupled by a screw or an adhesive such as a double-sided tape.

The guide frame 530 is formed in a tetragonal frame shape to have a stepped surface, and placed in the supporting case 110 of the backlight unit 520. The guide frame 530 supports a rear edge portion of the liquid crystal display panel 540 and surrounds a side surface of the liquid crystal display panel 540. To this end, the guide frame 520 includes a guide side wall 532 and a panel supporting part 534.

The guide side wall 532 is formed in a tetragonal frame shape to have a certain height, and surrounds the supporting side wall and the side surface of the liquid crystal display panel 540. The guide side wall 532 may be coupled to the cover side wall 514 of the rear cover 510. In this case, the guide side wall 532 and the cover side wall 514 may be coupled by a hook coupling scheme.

The panel supporting part 534 protrudes from an inner side surface of the guide side wall 532 in a tetragonal belt shape having a certain width, and supports a rear edge portion of the liquid crystal display panel 540. A panel buffer member (not shown) may be formed in the panel supporting part 534. In this case, the rear edge portion of the liquid crystal display panel 540 is disposed in the panel buffer member.

The liquid crystal display panel 540 is disposed in the panel supporting part 534 of the guide frame 530, and displays a certain image with light emitted from the backlight unit 520. To this end, the liquid crystal display panel 540 includes a lower substrate 542 and an upper substrate 544 that are facing-coupled with a liquid crystal layer (not shown) therebetween, a lower polarizing member 546, and an upper polarizing member 548.

The lower substrate 542 includes a plurality of pixels (not shown) that are respectively formed in a plurality of areas defined by intersections between a plurality of gate lines (not shown) and a plurality of data lines (not shown). Each of the pixels may include a TFT (not shown) connected to a gate line and a data line, a pixel electrode connected to the TFT, and a common electrode that is formed adjacently to the pixel electrode and receives a common voltage. In this case, the common electrode may be formed in the upper substrate 544 depending on a liquid crystal driving mode for the liquid crystal layer. The lower substrate 542 generates an electric field corresponding to a difference voltage between a data voltage applied to each pixel and the common voltage, thereby adjusting light transmittance of the liquid crystal layer.

A pad part (not shown) connected to each of a plurality of signal lines is prepared in one side edge portion of the lower substrate 542, and the panel driver 550 is coupled to the pad part. Also, a gate driving circuit (not shown) for supplying a gate (scan) signal to the liquid crystal display panel 540 is disposed in an inactive area of one short side or both short sides of the lower substrate 542. The gate driving circuit is formed to be connected to the gate lines, simultaneously with a process of forming the TFT of each pixel.

The upper substrate 544 includes a color filter corresponding to each pixel formed in the lower substrate 542, and is facing-coupled to the lower substrate 542 with the liquid crystal layer therebetween. In this case, a common electrode to which the common voltage is applied depending on a driving mode of the liquid crystal layer may be formed in the upper substrate 544. The upper substrate 544 filters light incident through the liquid crystal layer by using a plurality of the color filters, and emits certain color light to the outside, thereby allowing the liquid crystal display panel 540 to display a certain color image.

The lower substrate 542 and the upper substrate 544 may be formed in various types known to those skilled in the art, depending on the driving mode of the liquid crystal layer, for example, a twisted nematic (TN) mode, a vertical alignment (VA) mode, an in-plane switching (IPS) mode, and a fringe field switching (FFS) mode.

The lower polarizing member 546 may be adhered to a bottom of the lower substrate 542, and polarizes light irradiated from the backlight unit 520 to the liquid crystal display panel 540.

The upper polarizing member 548 according to an embodiment is adhered to a top of the upper substrate 544, and may be configured with a polarizing film that polarizes color light emitted to the outside through the upper substrate 544.

The upper polarizing member 548 according to another embodiment is adhered to a top of the upper substrate 544, and may include: a polarizing film that polarizes color light emitted to the outside through the upper substrate 544; and a retarder film (not shown) that is adhered to a top of the upper polarizing film and divides a three-dimensional (3D) image (i.e., a left-eye image and a right-eye image), displayed by the liquid crystal display panel 540, into different polarized states.

The panel driver 550 is connected to the pad part prepared in one side edge portion of the lower substrate 542, and drives each pixel of the liquid crystal display panel 540, thereby displaying a certain image on the liquid crystal display panel 540. To this end, the panel driver 550 includes a plurality of circuit films 552 coupled to the pad part of the lower substrate 542, a data driving IC 554 mounted on each of the circuit films 552, a printed circuit board (PCB) 556 coupled to each of the circuit films 552, and a timing controller 558 mounted on the PCB 556.

Each of the circuit films 552 is adhered to the pad part of the lower substrate 542 and the PCB 556 in a tape automated bonding (TAB) process, and may be implemented as a tape carrier package (TCP) or a chip on flexible board (chip on film, COF). Each of the circuit films 552 may be disposed at the side surface of the guide frame 530, or bent toward the rear surface of the supporting case 110 to surround the side surface of the guide frame 530.

The data driving IC 554 is mounted on each of the circuit films 552. The data driving IC 554 converts input data into data voltages, and supplies the data voltages to respective data lines of the liquid crystal display panel 540.

The PCB 556 is electrically connected to the circuit films 552, and supplies various signals for displaying an image to the respective pixels of the liquid crystal display panel 540. Various power source circuits (not shown), a memory (not shown), etc. are mounted on the PCB 556.

The timing controller 558 is mounted on the PCB 56. The timing controller 558 aligns video data, inputted from an external driving system (not shown), to be suitable for the liquid crystal display panel 540 and supplies the aligned data to the data driving IC 554, in response to a timing sync signal supplied from the external driving system. Also, the timing controller 558 generates a data control signal and a gate control signal on the basis of the timing sync signal to control the driving timing of the data driving IC 554 and the driving time of the gate driving circuit.

Moreover, the timing controller 558 controls emission of each LED package of the backlight unit 520 through a backlight driving circuit (not shown), thereby controlling luminance of light irradiated on the liquid crystal display panel 540. In this case, the timing controller 558 may control emission of each LED package on the basis of input data.

The panel driver 550 may be configured with one driving IC that is directly mounted on the lower substrate 542 of the liquid crystal display panel 540. The one driving IC includes a data driver, a gate driver, and a timing controller, and displays a certain image on the liquid crystal display panel 540.

The front cover 560 is formed in a tetragonal frame shape to have a "┐"-shaped or "┌"-shaped sectional surface, and coupled to the side surface of the guide frame 530 or coupled to the cover side wall 514 of the rear cover 510. The front cover 560 surrounds a front edge portion (or inactive area) of the liquid crystal display panel 540 and the side surface of the guide frame 530.

A front surface and side surface of the front cover 560 are exposed to the outside of the LCD device, and act as a cover that surrounds a front surface and side surface of a produced LCD device. Especially, the front surface of the front cover 560 determines the Bezel width of the LCD device. Therefore, unlike the related art, the present invention does not form a groove in the light guide plate 120, and, as illustrated in FIG. 20, the present invention prevents the deformation and movement of the light guide plate 120 by using the plurality of holder members 160 installed between the side surface of the light guide plate 120 and the supporting case 110, thus decreasing the Bezel width of the LCD device.

In FIGS. 19 and 20, the backlight unit 520 is illustrated as having the same configuration as that of the backlight unit 100 of FIGS. 1 to 9 according to the first embodiment of the present invention, but is not limited thereto. As another example, the backlight unit 520 may be configured identically to any one of the backlight units 200, 300 and 400 according to the second to fourth embodiments of the present invention.

Figure 21:
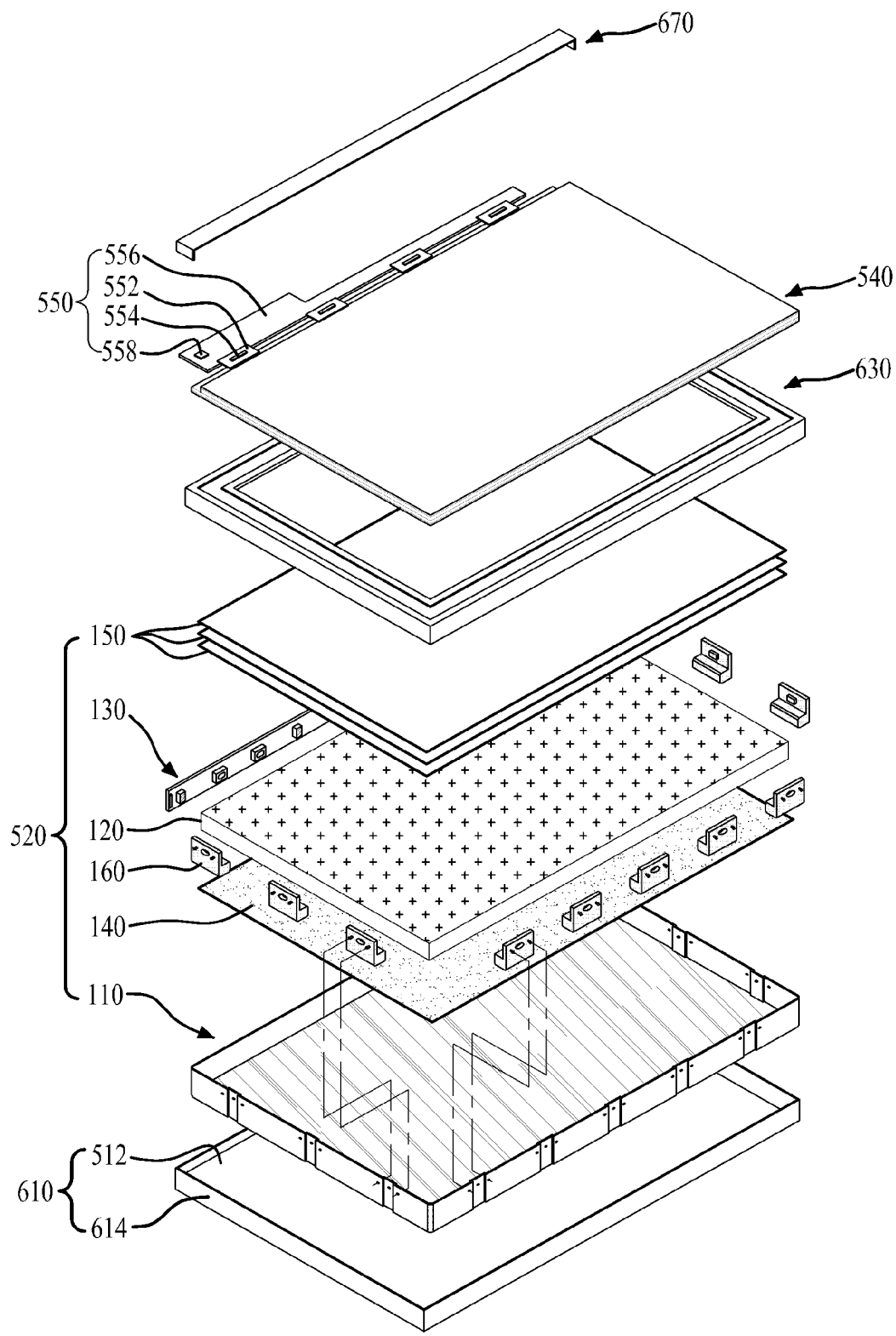
FIG. 21 is an exploded perspective view schematically illustrating an LCD device according to a second embodiment of the present invention.
Figure 22:
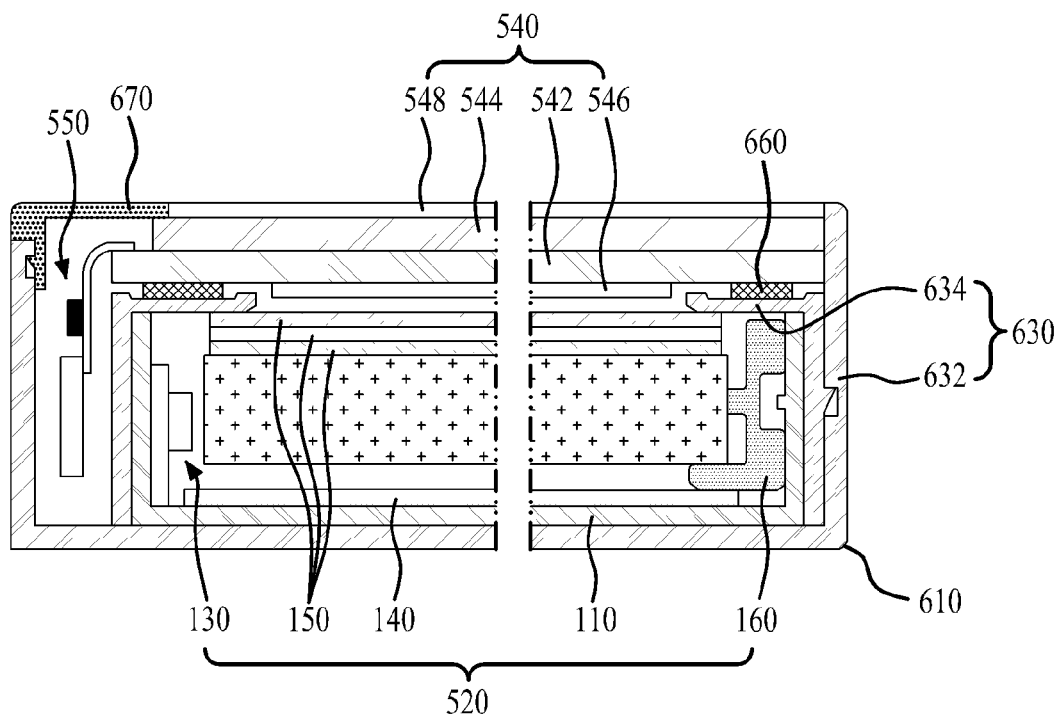
FIG. 22 is a sectional view schematically illustrating a partially sectional surface of the LCD device according to the second embodiment of the present invention.

FIG. 21 is an exploded perspective view schematically illustrating an LCD device according to a second embodiment of the present invention. FIG. 22 is a sectional view schematically illustrating a partially sectional surface of the LCD device according to the second embodiment of the present invention.

Referring to FIGS. 21 and 22, the LCD device according to the second embodiment of the present invention includes a rear cover 610, the backlight unit 520, a guide frame 630, the liquid crystal display panel 540, the panel driver 550, a panel coupling member 660, and a deco cover 670. In the LCD device according to the second embodiment of the present invention having the above-described configuration, an entire front area except one side edge portion of the liquid crystal display panel 540 connected to the panel driver 550 is exposed to the outside. To this end, the LCD device according to the second embodiment of the present invention further includes the panel coupling member 660 and the deco cover 670 instead of the removed front cover 560, and the rear cover 610 and the guide frame 630 are changed in structure. In the following description on the LCD device according to the second embodiment of the present invention, therefore, the changes in the rear cover 610 and guide frame 630, the panel coupling member 660, and the deco cover 670 will be described, and the above descriptions are applied to the other elements.

A cover side wall 614 of the rear cover 610 is formed to surround the side surface of the guide frame 630 and the side surface of the liquid crystal display panel 540. In this case, the height of the cover side wall 614 is set such that a top of the cove side wall 614 is not stepped with respect to the top of the liquid crystal display panel 540.

A certain gap space (not shown) may be formed between the cover side wall 614 and the side surface of the liquid crystal display panel 540 due to a process error caused by a manufacturing process. In this case, a foreign material penetrates into the LCD device through the gap space, and thus, the gap space may be sealed by a sealing member (not shown).

The guide frame 630 is formed in a tetragonal frame shape, and disposed in the supporting case 110 of the backlight unit 520. The guide frame 630 is coupled to the rear edge portion of the liquid crystal display panel 540 with the panel coupling member 660, and surrounds the side surface of the supporting case 110. To this end, the guide frame 630 includes a guide side wall 632 that is formed to have a "¬"-shaped sectional surface, and a panel supporting part 634.

The guide side wall 632 is formed in a tetragonal frame shape to have a certain height, and surrounds the side surface of the supporting side wall. The guide side wall 632 may be coupled to the cover side wall 614 of the rear cover 610. In this case, the guide side wall 632 and the cover side wall 614 may be coupled by a hook coupling scheme.

The panel supporting part 634 protrudes from an upper inner side surface of the guide side wall 632 in a tetragonal belt shape having a certain width, and is disposed in the supporting side wall of the supporting case 110. A coupling member formation groove that is formed to have a certain depth is formed at a top of the panel supporting part 634, and facilitates the formation of the panel coupling member 660. The panel supporting part 634 is coupled to the rear edge portion of the LCD device 540 with the panel coupling member 660.

The panel coupling member 660 is formed in the panel supporting part 634 of the guide frame 630, and couples the liquid crystal display panel 540 and the guide frame 630. In this case, the panel coupling member 660 may be coupled to the lower substrate 542 of the liquid crystal display panel 540 in consideration of coupling strength between the guide frame 630 and the liquid crystal display panel 540 and the thickness thereof, but is not limited thereto. As another example, the panel coupling member 660 may be coupled to the lower polarizing member 546 of the liquid crystal display panel 540. The panel coupling member 660 may be configured with a double-sided tape, a thermosetting adhesive, or a photocurable adhesive.

The deco cover is formed with a "⌐"-shaped sectional surface to cover the front one side edge portion of the liquid crystal display panel 540 and a side surface contacting the edge portion. The deco cover 670 is coupled to the cover side wall 614 of the rear cover 610, and covers the pad part of the liquid crystal display panel 540 and the panel driver 550 connected to the pad part. To this end, the deco cover 670 includes the pad part of the liquid crystal display panel 540, a front deco part that covers the panel driver 550 connected to the pad part, and a side deco part that is vertically bent from the front deco part and coupled to the cover side wall 614 of the rear cover 610.

A front surface of the front deco part is not stepped with respect to a top of the upper polarizing member 548, and is disposed on the same plane as that of the top. Therefore, when viewed from a front surface of the LCD device, the front deco part is not stepped with respect to each of the upper polarizing member 548 and the cover side wall 614, and thus, the front surface of the LCD device has a flat plane. In this case, to enhance an aesthetic design, the color of each of the deco cover 670 and the rear cover 610 may be the same as that of the upper polarizing member 548 which is seen when the LCD device is in a turn-off state.

In FIGS. 21 and 22, the backlight unit 520 is illustrated as having the same configuration as that of the backlight unit 100 of FIGS. 1 to 9 according to the first embodiment of the present invention, but is not limited thereto. As another example, the backlight unit 520 may be configured identically to any one of the backlight units 200, 300 and 400 according to the second to fourth embodiments of the present invention.

According to the second embodiment of the present invention, by removing the front cover, the Bezel width of the LCD device can be more reduced, and the front surface of the LCD device becomes flat, thus enhancing the aesthetic design of the LCD device.

As described above, the plurality of holder members disposed between the supporting side wall of the supporting case and the side surface of the light guide plate are deformed in shape by the thermal deformation of the light guide plate, and prevents the deformation of the light guide plate expanded by heat and the movement of the light guide plate contracted by heat, thus decreasing the Bezel width of the LCD device.

Moreover, by removing the front cover, the Bezel width of the LCD device can be more reduced, and the front surface of the LCD device becomes flat, thus enhancing the aesthetic design of the LCD device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit, comprising:
   a supporting case supporting a supporting side wall having a receiving space;
   a light guide plate placed in the receiving space of the supporting case;
   a light source member irradiating light on a light incident surface prepared in a side surface of the light guide plate;
   an optical sheet member disposed on the light guide plate; and
   a plurality of holder members disposed at certain intervals between the supporting side wall and some side surfaces of the light guide plate except the light incident surface, the holder members being deformed in shape by thermal deformation of the light guide plate.

2. The backlight unit of claim 1, wherein each of the holder members has a thermal expansion space for accommodating thermal expansion of the light guide plate.

3. The backlight unit of claim 1, wherein each of the holder members is compressed by high-temperature thermal expansion of the light guide plate, and maintains a shape at a normal temperature.

4. The backlight unit of claim 1, wherein each of the holder members comprises:
   a body coupled to an inner side surface of the supporting side wall, and supporting a bottom edge portion of the light guide plate and facing the side surface of the light guide plate;
   at least one protrusion portion protruding from an inner side surface of the body to contact the side surface of the light guide plate, the protrusion portion being deformed in shape by the thermal deformation of the light guide plate; and
   a groove part formed concavely from an outer side surface of the body, and preparing a compressive space for the protrusion portion that is deformed by the thermal deformation of the light guide plate.

5. The backlight unit of claim 4, wherein each of the holder members protrudes from the outer side surface of the body in correspondence with the protrusion portion, and respectively coupled to a pair of coupling holes formed in the supporting side wall.

6. The backlight unit of claim 4, wherein each of the holder members further comprises at least one hollow portion formed to pass through the protrusion portion.

7. The backlight unit of claim 1, wherein each of the holder members comprises:
   a body formed vertically to face the side surface of the light guide plate, and coupled to an inner side surface of the supporting side wall;
   at least one protrusion portion protruding from an inner side surface of the body to contact the side surface of the light guide plate, the protrusion portion being deformed in shape by the thermal deformation of the light guide plate; and
   a groove part formed concavely from an outer side surface of the body, and preparing a compressive space for the protrusion portion that is deformed by the thermal deformation of the light guide plate.

8. The backlight unit of claim 1, wherein each of the holder members comprises:
   a body coupled to an inner side surface of the supporting side wall, and formed vertically to face the side surface of the light guide plate, the body being deformed in shape by the thermal deformation of the light guide plate; and
   a plurality of hollow portions formed to pass through the body, and preparing a compressive space for the body that is compressed by thermal expansion of the light guide plate.

9. The backlight unit of claim 1, further comprising a corner holder member disposed between a corner portion of the light guide plate except one side edge portion contacting the light incident surface of the light guide plate and a corner portion of the supporting case surrounding the corner portion of the light guide plate.

10. The backlight unit of claim 9, wherein the corner holder member comprises:
    a body coupled to an inner side surface of the supporting side wall, and formed in a "⌐"-shape to contact each side surface of the corner portion of the light guide plate, the body being deformed in shape by thermal deformation of the light guide plate; and
    a plurality of hollow portions formed to pass through the body, and preparing a compressive space for the body that is compressed by thermal expansion of the light guide plate.

11. The backlight unit of claim 1, wherein each of the holder members is formed of an elastic material.

12. The backlight unit of claim 1, wherein each of the holder members is formed of an elastic material having a hardness of 50 degrees to 75 degrees.

13. The backlight unit of claim 1, wherein each of the holder members has a non-reflective color.

14. A liquid crystal display (LCD) device, comprising:
    a backlight unit, comprising:
        a supporting case supporting a supporting side wall having a receiving space;
        a light guide plate placed in the receiving space of the supporting case;
        a light source member irradiating light on a light incident surface prepared in a side surface of the light guide plate;
        an optical sheet member disposed on the light guide plate; and
        a plurality of holder members disposed at certain intervals between the supporting side wall and some side surfaces of the light guide plate except the light incident surface, the holder members being deformed in shape by thermal deformation of the light guide plate;
    a liquid crystal display panel disposed on the backlight unit;
    a guide frame disposed in the supporting case of the backlight unit, and supporting a rear edge portion of the liquid crystal display panel;
    a rear cover receiving the supporting case, and surrounding a side surface of the guide frame; and
    a front cover coupled to the rear cover to surround a front edge portion and side surface of the liquid crystal display panel.

15. The liquid crystal display device of claim 14, wherein each of the holder members has a thermal expansion space for accommodating thermal expansion of the light guide plate.

16. The liquid crystal display device of claim 14, wherein each of the holder members is compressed by high-temperature thermal expansion of the light guide plate, and maintains a shape at a normal temperature.

17. A liquid crystal display (LCD) device, comprising:
    a backlight unit, comprising:
        a supporting case supporting a supporting side wall having a receiving space;
        a light guide plate placed in the receiving space of the supporting case;
        a light source member irradiating light on a light incident surface prepared in a side surface of the light guide plate;
        an optical sheet member disposed on the light guide plate; and
        a plurality of holder members disposed at certain intervals between the supporting side wall and some side surfaces of the light guide plate except the light incident surface, the holder members being deformed in shape by thermal deformation of the light guide plate;
    a liquid crystal display panel disposed on the backlight unit;
    a guide frame disposed in the supporting case of the backlight unit, and coupled to a rear edge portion of the liquid crystal display panel by a coupling member;

a panel driver connected to one side of the liquid crystal display panel;

a rear cover receiving the supporting case, and surrounding a side surface of the guide frame, a side surface of the panel driver, and a side surface of the liquid crystal display panel; and a deco cover coupled to the rear cover to cover one side of the liquid crystal display panel, and externally exposing an entire front surface except one side of the liquid crystal display panel.

18. The liquid crystal display device of claim 17, wherein each of the holder members has a thermal expansion space for accommodating thermal expansion of the light guide plate.

19. The liquid crystal display device of claim 17, wherein each of the holder members is compressed by high-temperature thermal expansion of the light guide plate, and maintains a shape at a normal temperature.

20. The liquid crystal display device of claim 17, wherein the backlight unit further comprises a corner holder member disposed between a corner portion of the light guide plate except one side edge portion contacting the light incident surface of the light guide plate and a corner portion of the supporting case surrounding the corner portion of the light guide plate.

\* \* \* \* \*